United States Patent
Barnes

(10) Patent No.: US 10,676,144 B2
(45) Date of Patent: Jun. 9, 2020

(54) MODULAR TRAILER AND ACCESSORY SYSTEM

(71) Applicant: PJ Trailers, Inc., Sumner, TX (US)

(72) Inventor: Aaron Neil Barnes, Paris, TX (US)

(73) Assignee: PJ TRAILERS, INC., Sumner, TX (US)

( * ) Notice: Subject to any disclaimer, the term of this patent is extended or adjusted under 35 U.S.C. 154(b) by 121 days.

(21) Appl. No.: 15/660,816

(22) Filed: Jul. 26, 2017

(65) Prior Publication Data

US 2018/0029656 A1    Feb. 1, 2018

Related U.S. Application Data

(60) Provisional application No. 62/368,096, filed on Jul. 28, 2016.

(51) Int. Cl.

| | |
|---|---|
| *B62D 63/06* | (2006.01) |
| *B62D 63/08* | (2006.01) |
| *B62D 33/02* | (2006.01) |
| *B62D 33/033* | (2006.01) |
| *B60S 9/02* | (2006.01) |
| *B60S 9/22* | (2006.01) |
| *B60R 11/06* | (2006.01) |
| *B60P 1/54* | (2006.01) |
| *B60N 3/10* | (2006.01) |
| *B60N 3/16* | (2006.01) |
| *B60P 3/10* | (2006.01) |
| *B60R 9/10* | (2006.01) |
| *B60R 9/02* | (2006.01) |
| *B60R 15/04* | (2006.01) |
| *B60N 3/00* | (2006.01) |
| *B60J 7/16* | (2006.01) |

(Continued)

(52) U.S. Cl.
CPC .............. *B62D 63/08* (2013.01); *B60J 7/085* (2013.01); *B60J 7/1607* (2013.01); *B60N 3/002* (2013.01); *B60N 3/103* (2013.01); *B60N 3/16* (2013.01); *B60P 1/435* (2013.01); *B60P 1/5471* (2013.01); *B60P 1/64* (2013.01); *B60P 3/105* (2013.01); *B60R 9/02* (2013.01); *B60R 9/10* (2013.01); *B60R 11/06* (2013.01); *B60R 15/04* (2013.01); *B60S 9/02* (2013.01); *B60S 9/22* (2013.01); *B62D 33/0207* (2013.01); *B62D 33/033* (2013.01); *B62D 43/02* (2013.01); *B62D 63/064* (2013.01); *H02S 10/40* (2014.12); *H02S 20/00* (2013.01); *A01D 75/004* (2013.01)

(58) Field of Classification Search
CPC ...... B62D 63/06; B62D 63/08; B62D 63/064; B62D 33/0207; B62D 33/033
See application file for complete search history.

(56) References Cited

U.S. PATENT DOCUMENTS 2,991,755 A * 7/1961 Ekren ................. A01K 1/0613
                                                           119/733
3,623,744 A * 11/1971 Bertness .............. B62D 63/061
                                                           280/785

(Continued)

*Primary Examiner* — Tony H Winner
*Assistant Examiner* — Michael R Stabley
(74) *Attorney, Agent, or Firm* — Foley & Lardner LLP

(57) ABSTRACT

A modular trailer system is disclosed. The system may include variously configured modular rails, tie down systems, fender mounting systems, cable fences, modular ramps, and/or mountable accessories whereby the versatile trailer system may be readily reconfigured.

14 Claims, 26 Drawing Sheets

(51) Int. Cl.
*B60J 7/08*         (2006.01)
*B60P 1/43*         (2006.01)
*B60P 1/64*         (2006.01)
*B62D 43/02*        (2006.01)
*H02S 10/40*        (2014.01)
*H02S 20/00*        (2014.01)
*A01D 75/00*        (2006.01)

(56) References Cited

U.S. PATENT DOCUMENTS

| | | | | |
|---|---|---|---|---|
| 4,867,497 A * | 9/1989 | Jayne | .................... | B60P 7/0815 296/3 |
| 4,995,129 A * | 2/1991 | Comardo | ............. | B62D 63/061 14/71.1 |
| 5,257,728 A * | 11/1993 | Gibson | .................... | B60R 9/08 224/321 |
| 5,340,134 A * | 8/1994 | Dodson | ................ | B62D 63/061 280/37 |
| 5,957,482 A * | 9/1999 | Shorter | .................... | B62B 3/02 280/47.35 |
| 6,450,472 B1 * | 9/2002 | Cook, Jr. | ................ | B60P 3/073 248/503 |
| 6,726,073 B2 * | 4/2004 | Sutton | .................... | B60R 9/00 224/403 |
| 6,733,219 B1 * | 5/2004 | Floe | .................... | B60D 1/065 296/57.1 |
| 6,773,025 B1 * | 8/2004 | Zelm | .................... | B62D 63/061 280/40 |
| 6,962,370 B2 * | 11/2005 | Simpson | ............. | B62D 63/061 280/47.34 |
| 7,052,033 B2 * | 5/2006 | McDonell | ............. | B60D 1/155 280/639 |
| 7,147,415 B2 * | 12/2006 | Rorie | .................... | B60P 3/00 410/7 |
| 7,246,731 B1 * | 7/2007 | Matherne, Sr. | .......... | B60P 3/073 224/403 |
| 7,452,000 B2 * | 11/2008 | Winter | ................. | B62D 63/061 280/42 |
| 7,475,901 B2 * | 1/2009 | Winter | .................... | B60D 1/143 280/35 |
| 7,543,842 B1 * | 6/2009 | Fiorini | .................... | B62B 3/025 280/43 |
| 8,061,571 B2 * | 11/2011 | Aghajanian | .............. | B60R 9/06 224/499 |
| 9,308,855 B1 * | 4/2016 | Hancock | ............... | B60P 7/0807 |
| 9,586,637 B2 * | 3/2017 | Kentner | ................. | B62D 63/08 |
| 9,714,060 B2 * | 7/2017 | Aiello | ................. | B62D 63/061 |
| 9,925,909 B2 * | 3/2018 | Byham | .................... | B60P 3/055 |
| D826,507 S * | 8/2018 | Wernberg | .................... | D34/12 |
| 10,363,857 B1 * | 7/2019 | Ulinger | | |
| 2005/0242141 A1 * | 11/2005 | Zhang | .................... | B60R 9/06 224/499 |

* cited by examiner

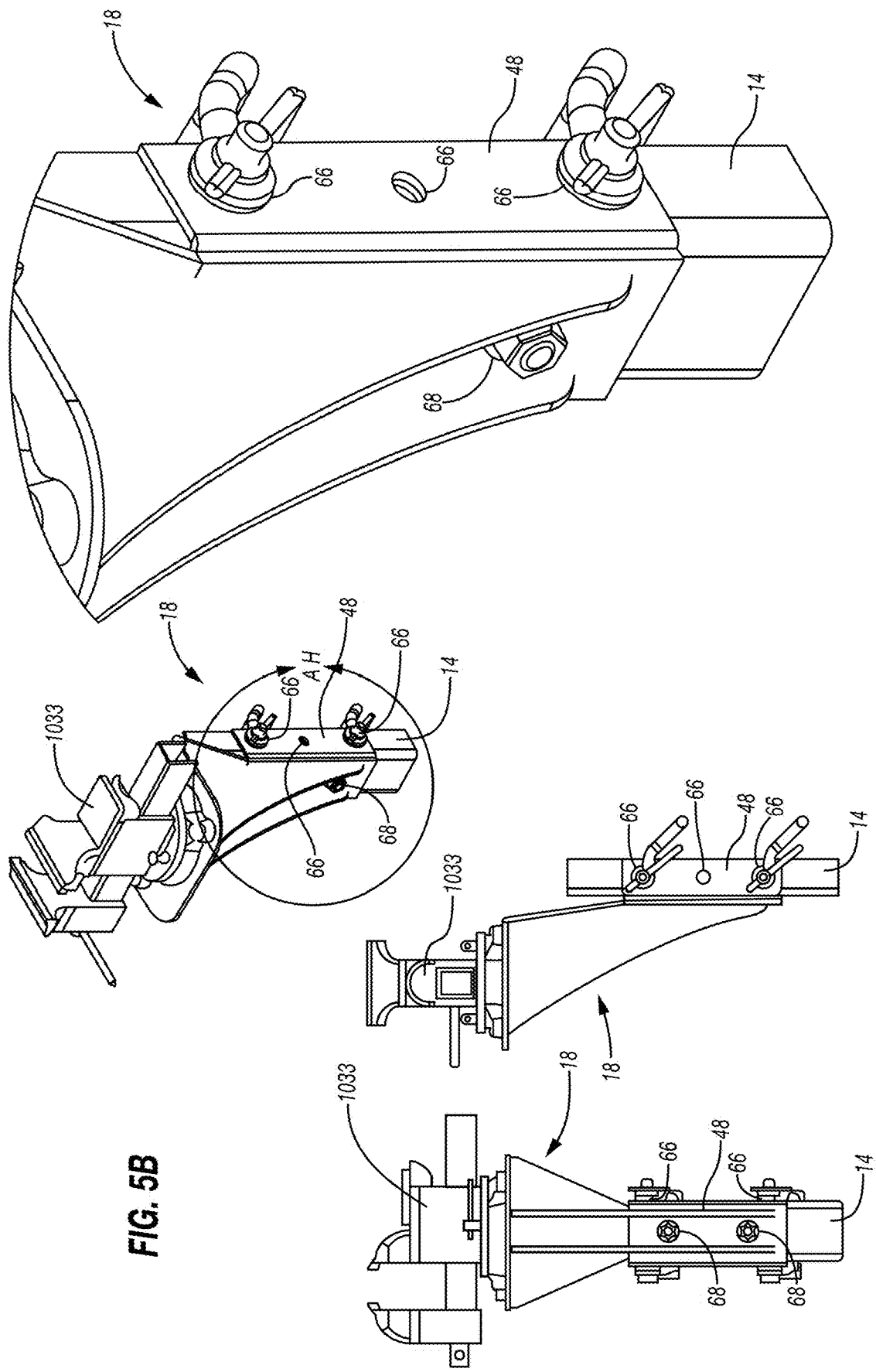

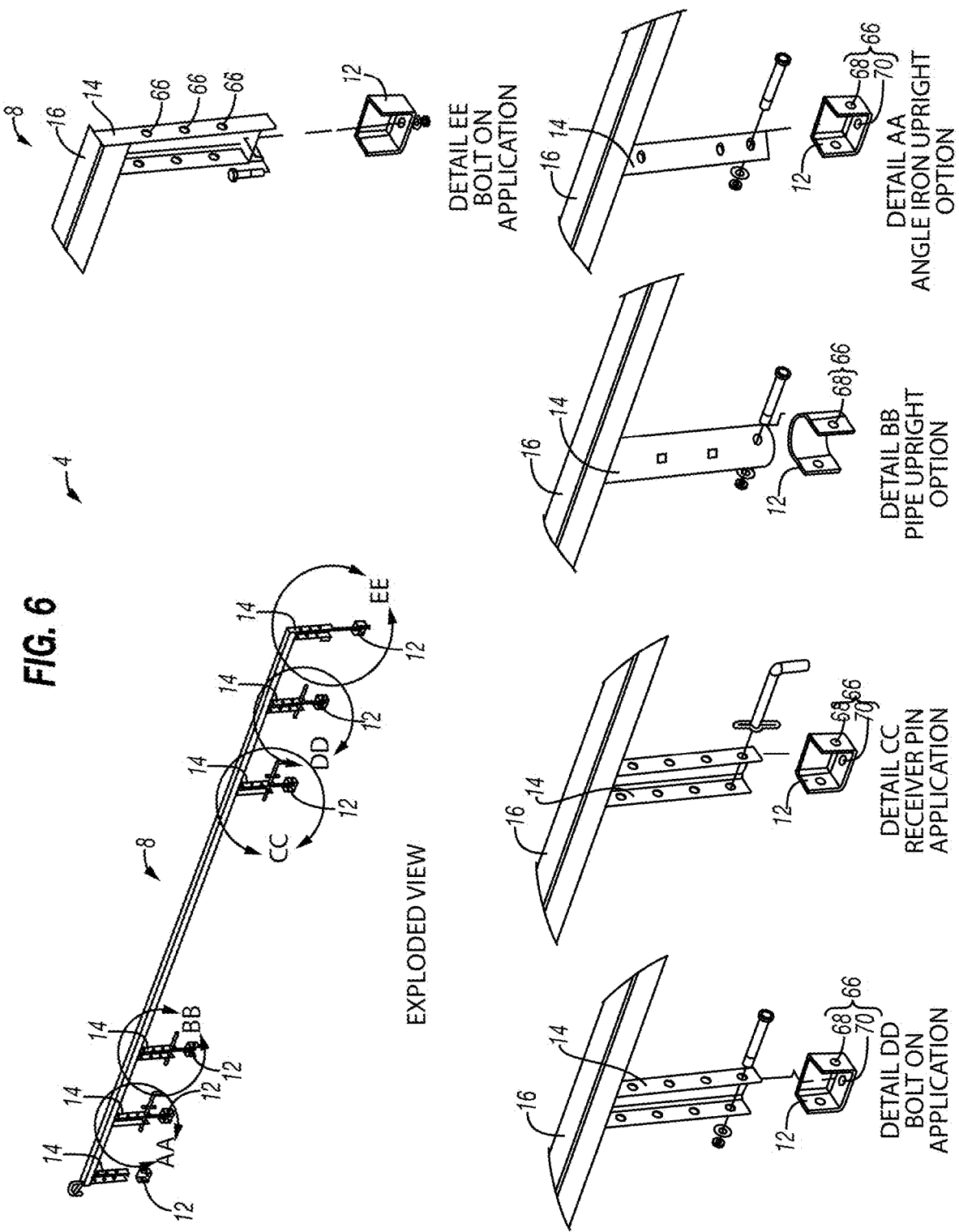

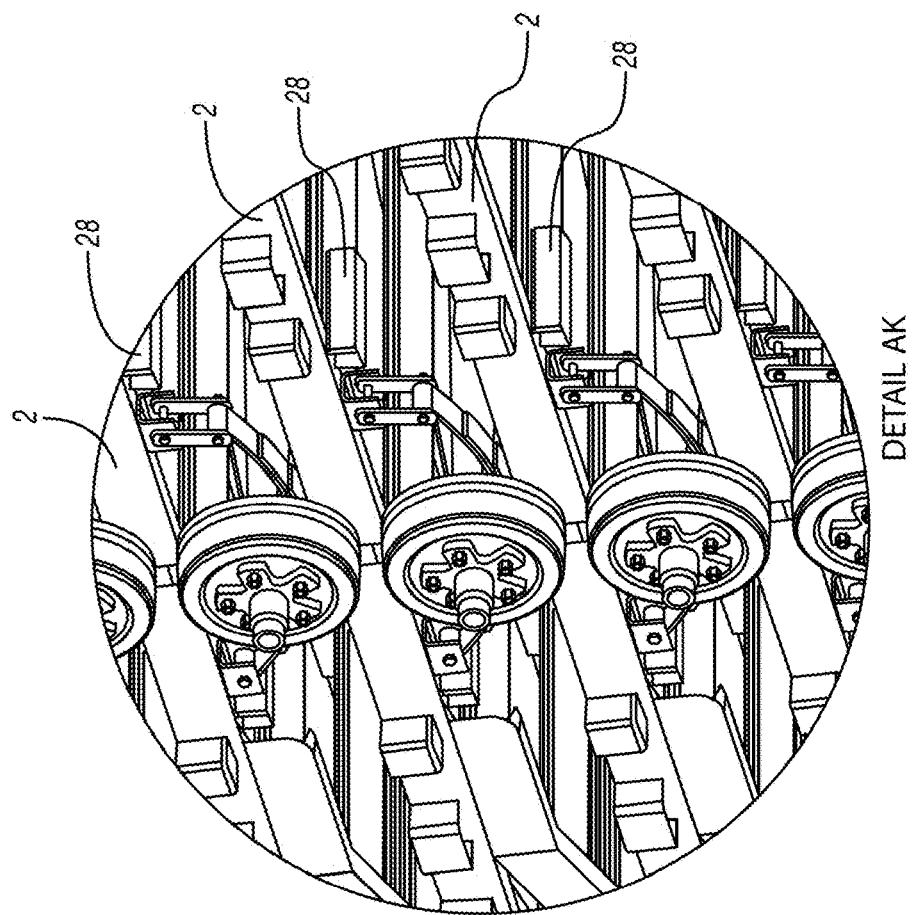
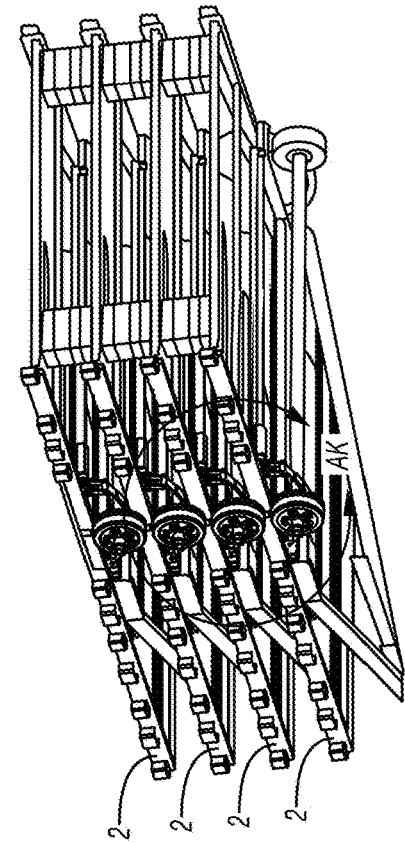
FIG. 7B

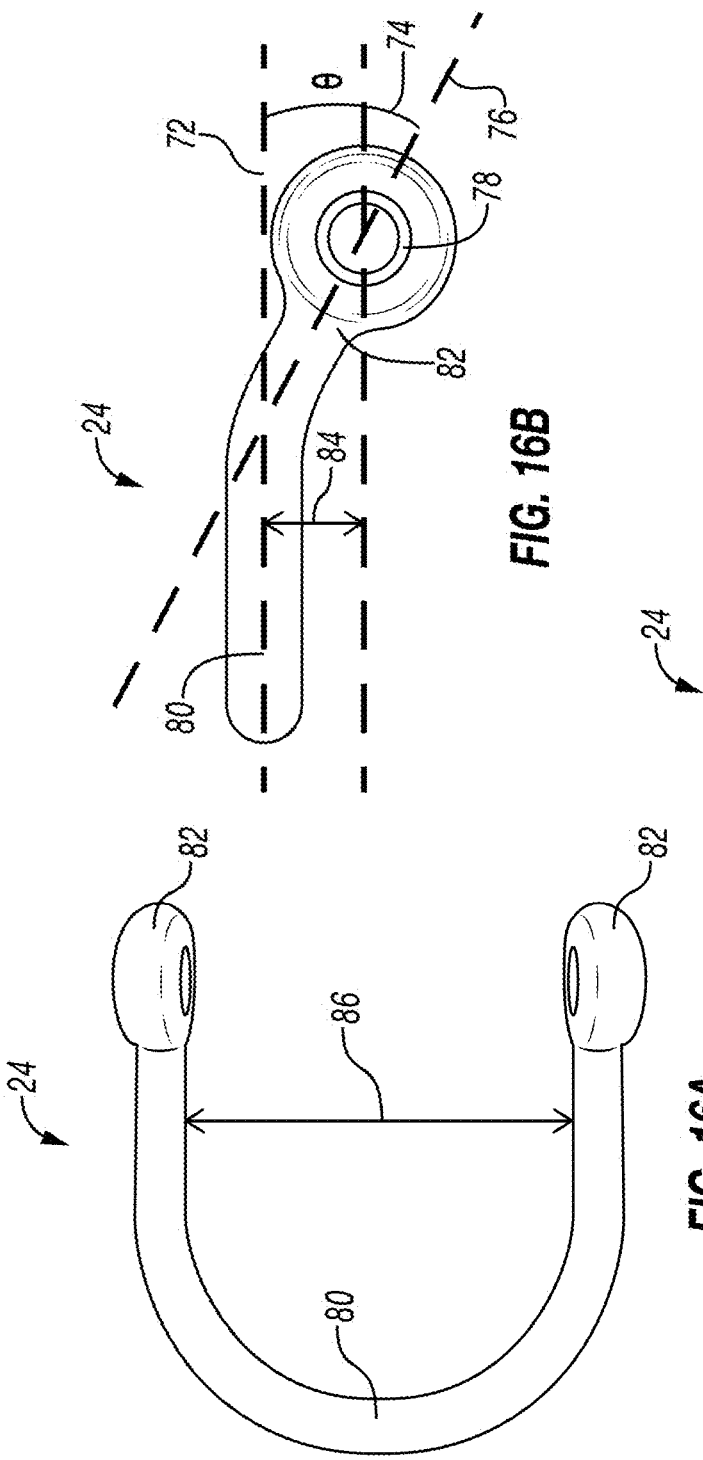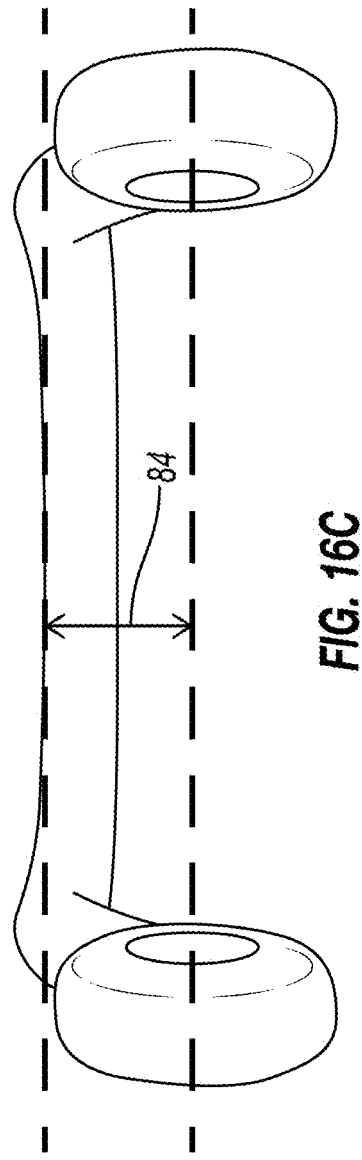

MODULAR TRAILER AND ACCESSORY SYSTEM

CROSS-REFERENCE TO RELATED APPLICATIONS

This application claims priority to, and the benefit of, U.S. Provisional Patent Application Ser. No. 62/368,096 entitled "Modular Trailer and Accessory System" filed on Jul. 28, 2016, the contents of which are hereby incorporated herein by reference in their entirety for any purpose.

TECHNICAL FIELD

This disclosure relates to a trailer, and more particularly, a trailer with interchangeable modular aspects.

BACKGROUND

Trailers are used to transport a variety of materials or structures for a variety of purposes. Frequently however, different uses require differently configured trailers. However, significant expense and time is involved in parking one trailer and connecting a different trailer when different configurations are sought. Moreover, simply exchanging one trailer for another is frequently inadequate to address the unexpected challenges arising when attempting to secure irregular or asymmetric loads.

SUMMARY

A modular trailer rail assembly is disclosed. The modular trailer rail assembly includes a top rail, and a plurality of uprights joined perpendicularly, or at an angle, to the top rail. In various embodiments, each upright includes a first pair of side upright apertures including a first side upright aperture and a second side upright aperture positioned a first lateral inset distance from a larger upright face and configured to receive at least one of a tie down pin of a tie down system and a cable fence.

A trailer is disclosed. The trailer may include a trailer body, a first set of upright pockets joined to the trailer body and including modular rail upright pockets, a modular rail mount associated with each upright pocket and including at least one of an end aperture each upright pocket, and an upright. The upright may include an upright mounting bolt extending downwardly from the upright and attachable to the end aperture, and a first pair of side upright apertures including a first side upright aperture and a second side upright aperture positioned a first lateral inset distance from a larger upright face and configured to receive a tie down pin of a tie down system. In certain embodiments a "stake pocket" may have an open bottom, while, in certain embodiments, an "upright pocket" may include an obstruction, either fully or partially, or a closed bottom. In certain implementations or embodiments, an upright pocket may be replaced or substituted with a stake pocket, and vice versa.

In various embodiments, a trailer may include a trailer body, and a fender mounting system attachable to the trailer body and configured to selectably connect a fender to the trailer body. In various embodiments, the fender mounting system includes a first swivel mount tube attached to the trailer body. The first swivel mount tube may have a first aperture defined through the first swivel mount tube and configured to receive a swivel attachment disposed through the first aperture in a first direction and into the trailer body. The first swivel mount tube may be configured to receive a fender stud of the fender into an internal area of the first swivel mount tube along an axis perpendicular to the first direction. The swivel attachment may include a bolt and a nut configured to be tightened and loosened, whereby the first swivel mount tube rotatably swivels on an axis of the bolt.

In further embodiments, a trailer may include a trailer body, a first set of upright pockets joined to the trailer body and including modular rail upright pockets, a modular rail mount associated with each upright pocket and including at least one of an end aperture each upright pocket, and a modular trailer rail assembly. The modular trailer rail assembly may include a top rail, and a plurality of uprights joined perpendicular to the top rail. Each upright may include a upright mounting bolt extending downwardly from the upright and attachable to the end aperture, and a first pair of side upright apertures including a first side upright aperture and a second side upright aperture positioned a first lateral inset distance from a larger upright face and configured to receive a tie down pin of a tie down system.

A tie-down ring including a curved member disposed in a curved member plane and a first attachment member and a second attachment member each comprising pin apertures. In various embodiments, the first attachment member and the second attachment member are separated by an aperture width and are both disposed in an attachment member plane. In various embodiments, the curved member lying in the curved member plane and the first and second attachment members lying in the attachment member plane intersect at a bend angle whereby the first attachment member and the second attachment member are spaced an offset distance from the curved member plane.

An accessory mounting system is disclosed. The accessory mounting system may include a mountable channel shaped to correspond to an upright and configured to nest over a web and at least a portion of each of a first side and a second side of the upright. The system may include an aperture defined through the mountable channel and alignable with the upright web aperture to receive at least one of a pin and a bolt, and a mountable accessory attached to the mountable channel. In various embodiments, the mountable accessory may be selectably joinable to the upright by the mountable channel.

DESCRIPTION OF THE FIGURES

FIG. 5B depicts example aspects of an accessory mounting system and a bench mount, in accordance with various embodiments;

FIG. 6 depicts various aspects of modular rails, in accordance with various embodiments;

FIG. 7B depicts a view of a plurality of trailers stacked for transportation;

FIGS. 16A-C detail views of a tie down ring, in accordance with various embodiments;

Like elements are referenced with like numerals.

DETAILED DESCRIPTION

Figure 1A:
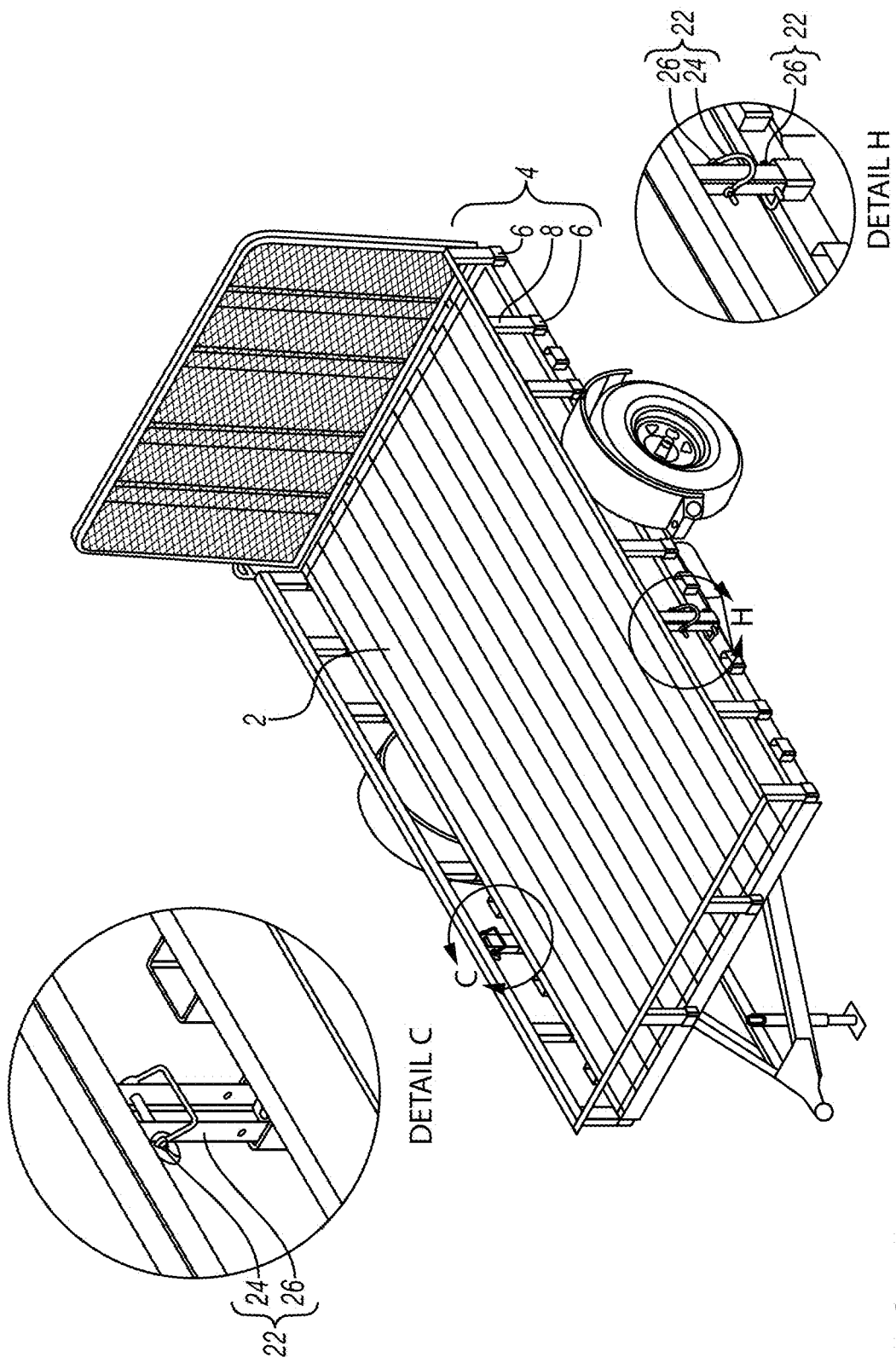
FIG. 1A depicts various trailer system aspects including a tie down system, in accordance with various embodiments.
Figure 1B:
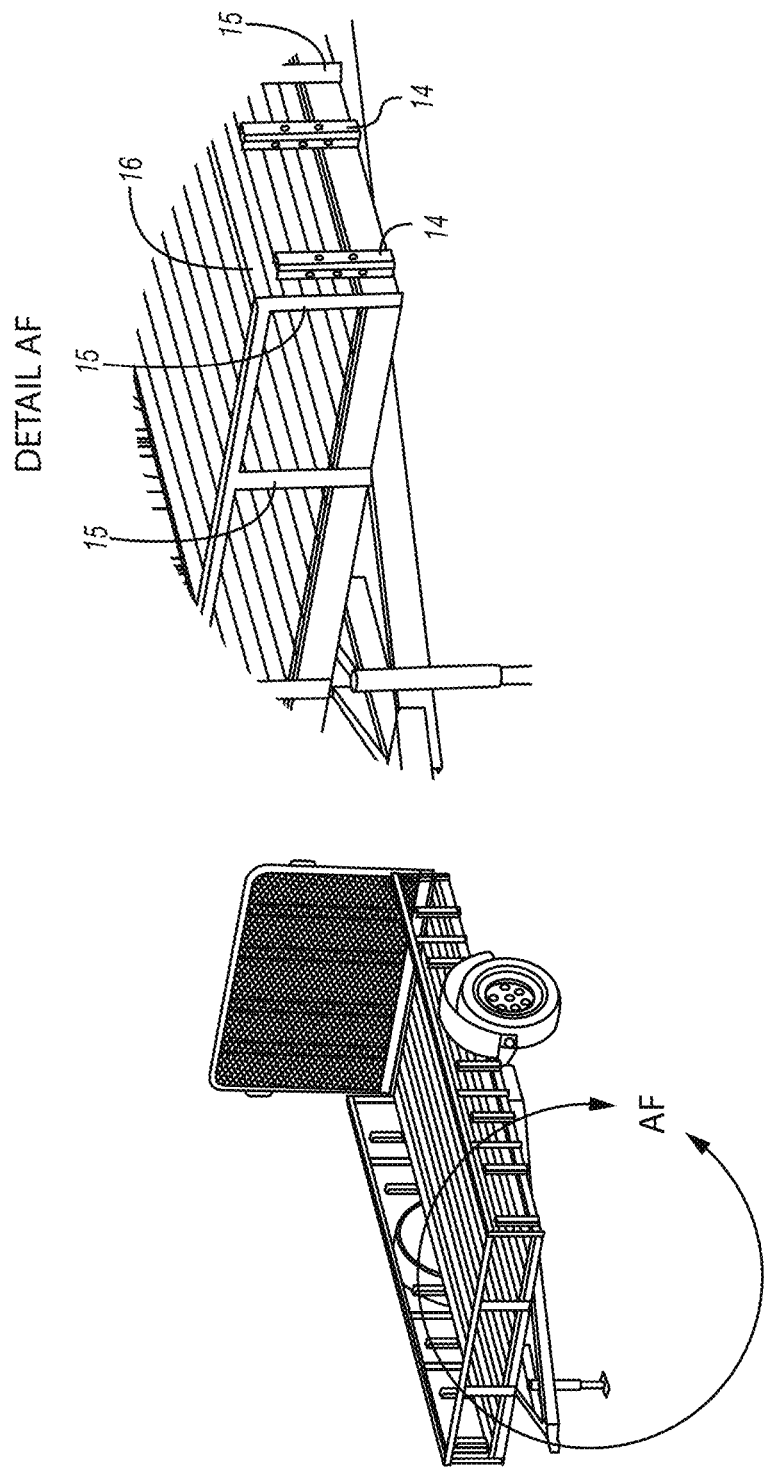
FIG. 1B depicts various trailer system aspects including uprights and hard mounted supports, in accordance with various embodiments.
Figure 1C:
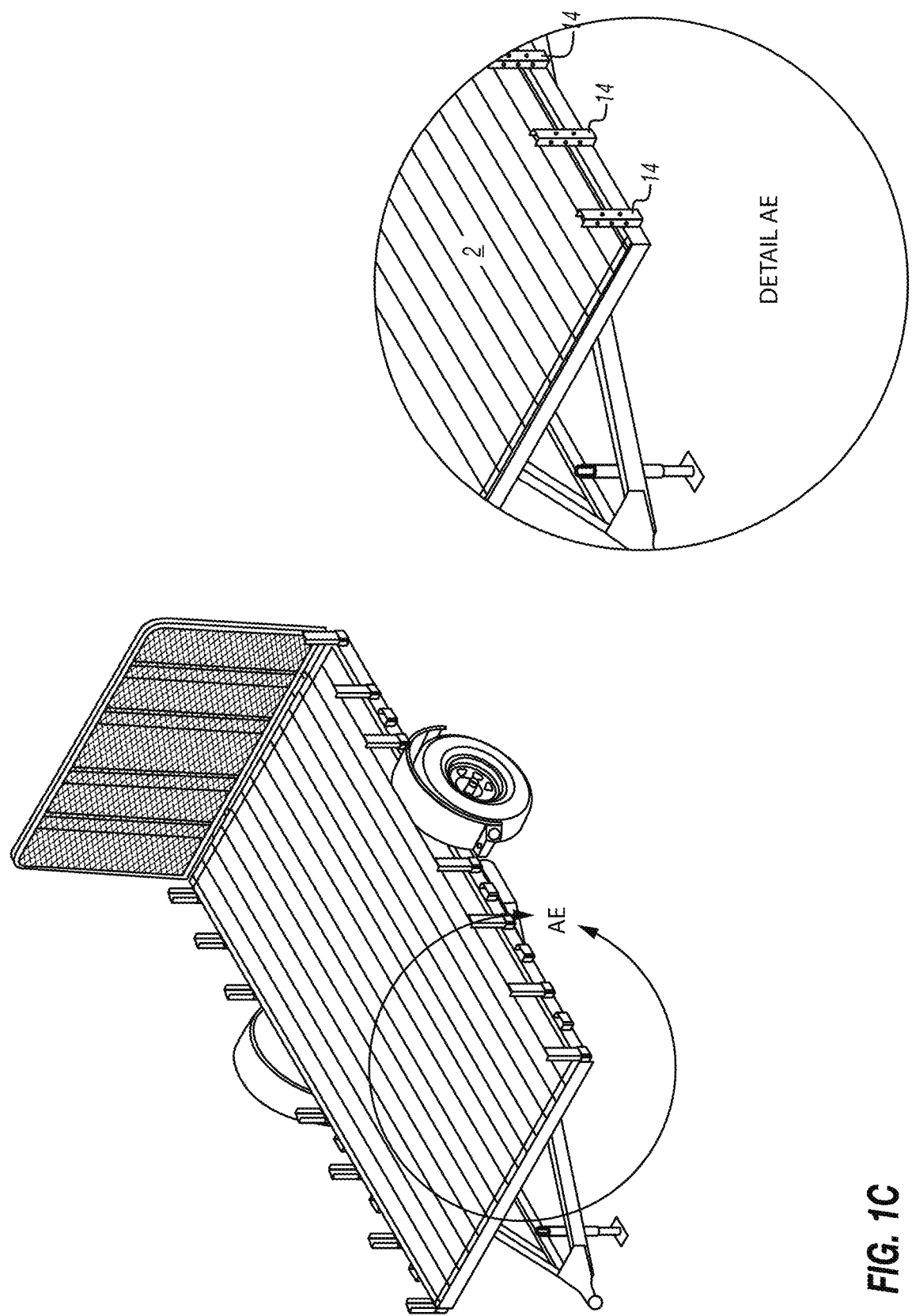
FIG. 1C depicts various trailer system aspects including uprights, in accordance with various embodiments.
Figure 1D:
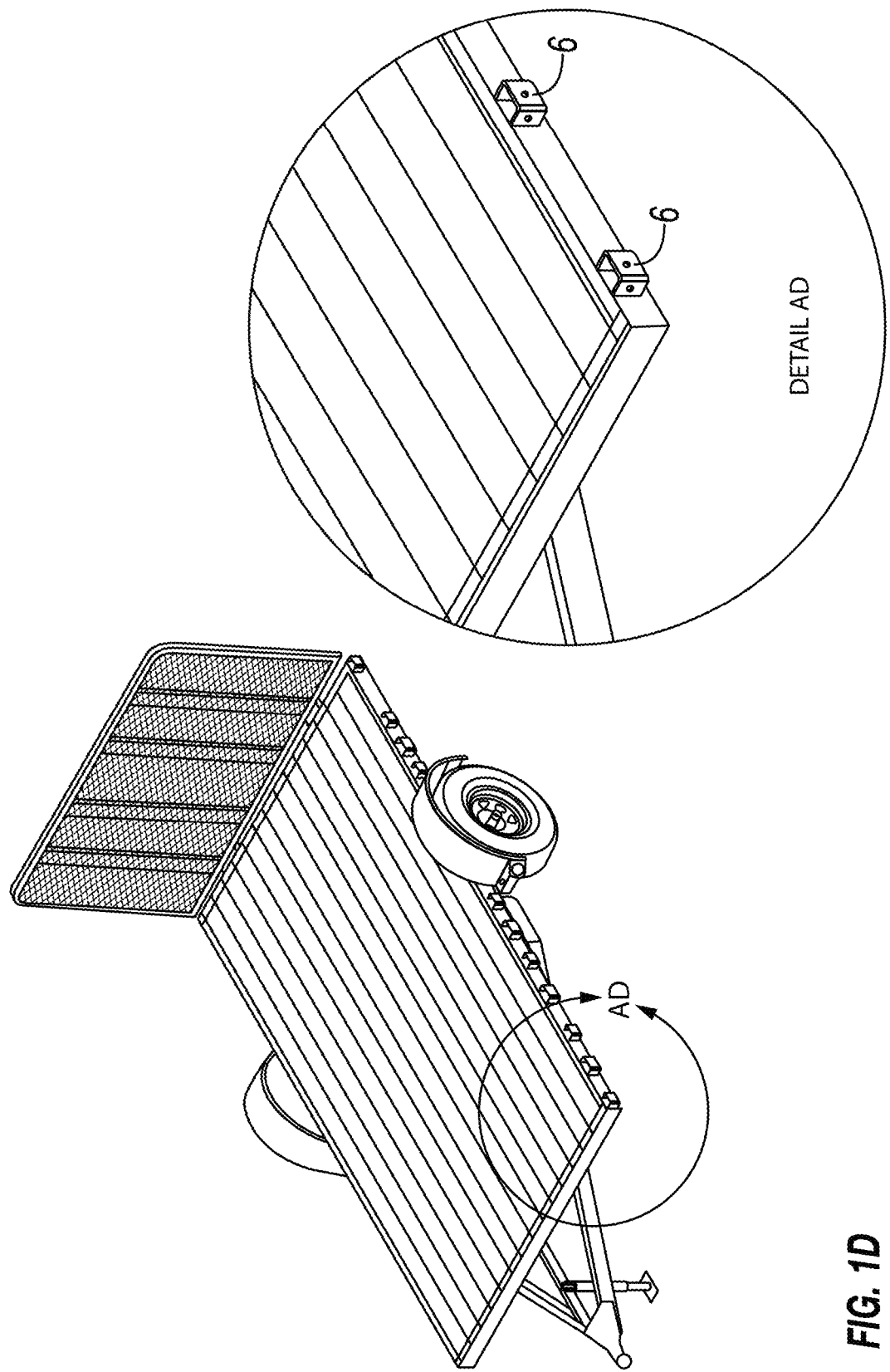
FIG. 1D depicts various trailer system aspects including upright pockets, in accordance with various embodiments.
Figure 2:
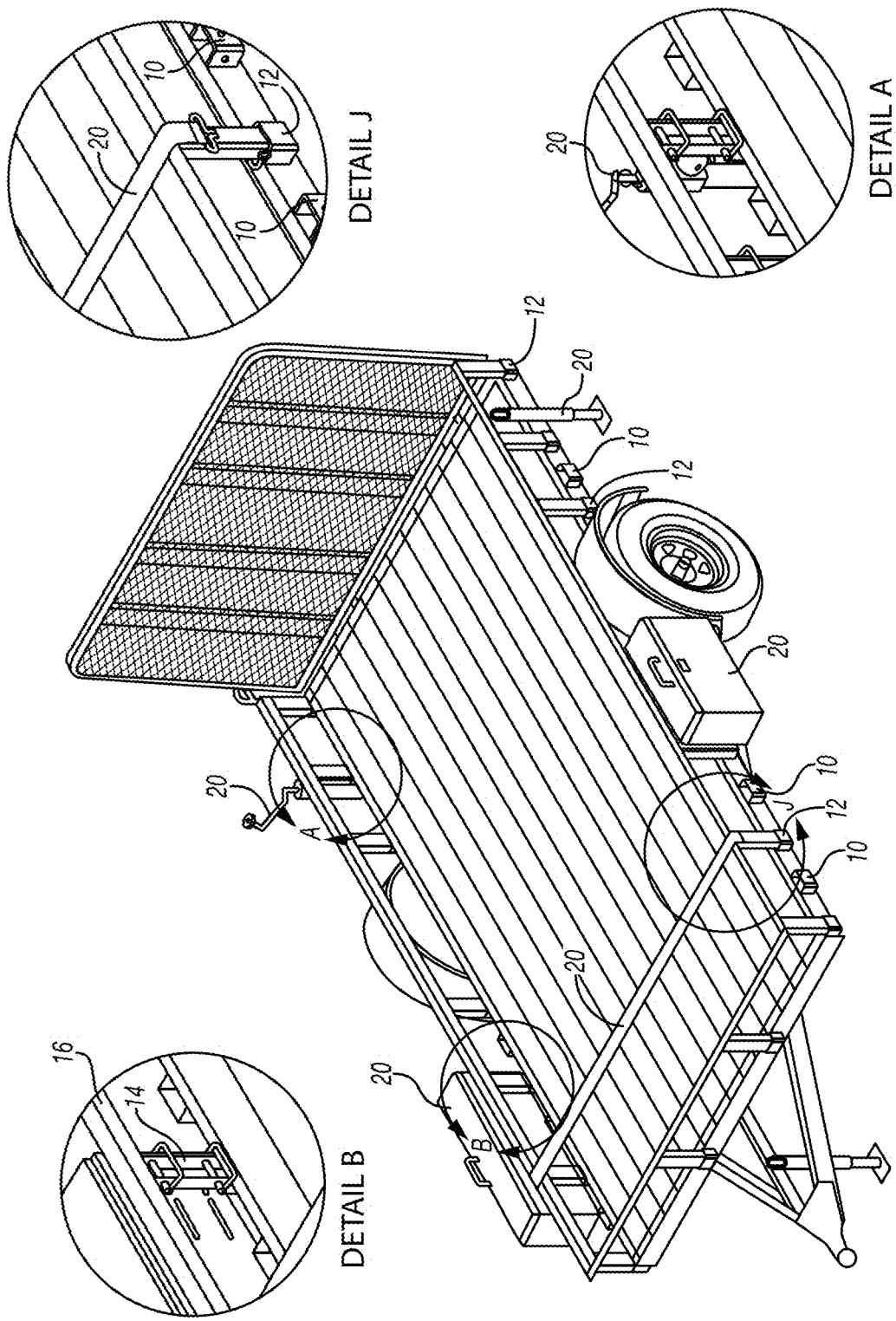
FIGS. 2-4 depict example mountable accessories, in accordance with various embodiments.

Trailers are frequently employed to transport products or materials, or to provide mobile work space. Depending on the nature of the use, a trailer may need to be configured in a particular way. For example, for transportation of bulky or irregularly shaped articles, a multiplicity of tie-down fixtures is desired so that the articles may be secured despite their bulky or irregular form. Moreover, a trailer may be employed in many different tasks, so that the configuration is desired to be changed frequently or in the field. With reference to FIGS. 1A-30, various aspects of a trailer system 4 are disclosed. The trailer system 4 may include different parts that can be selectably interconnected in differing manners to achieve these differing uses and configurations.

For instance, with reference to FIGS. 1A, 1D, 3, and 5A, the trailer system 4 may comprise upright pockets 6. An upright pocket 6 may comprise a structure disposed on an outer perimeter of a trailer body 2. Upright pockets 6 may be configured to receive various other aspects, such as uprights 14, which will be discussed further herein, and retain those aspects in mechanical communication with the trailer body 2. Consequently, by selectably joining aspects to an upright pocket 6, or unjoining aspects from an upright pocket 6, or by moving aspects joined to a first upright pocket 6 from that first upright pocket 6 and to a second upright pocket 6, the trailer system 4 may be reconfigured as desired. With momentary reference to FIGS. 1B-1C, in various embodiments, upright pockets 6 may be omitted and uprights 14 may be directly joined to the trailer body 2 of the trailer system.

With continuing reference to FIGS. 1A, 1B, 3, and 5A, and additional reference to FIG. 6, the trailer system 4 may comprise one or more modular rail 8. A modular rail 8 may comprise a peripheral wall attachable to the trailer body 2 and configured to prevent articles being carried on the trailer from dislodging from the trailer or configured to provide attachments so that other aspects may be connected securely to the trailer body 2 via the modular rail 8. Modular rails 8 may further be interconnectable to each other, such as at the corners of the trailer body 2, so that a continuous peripheral wall may be formed about the sides of the trailer body 2.

The trailer system 4 may comprise one or more accessory mounting system 18. An accessory mounting system 18 may comprise a series of apertures defined through various aspects to receive pins, bolts, and the like, so that accessories may be joined to the trailer system 4.

Turning to FIGS. 1A, 9-14, and 17-20, the trailer system 4 may comprise one or more tie down system 22. A tie down system 22 may be configured to retain loads in position on the trailer body 2 via straps, chains, ropes, and/or the like.

Figure 3:
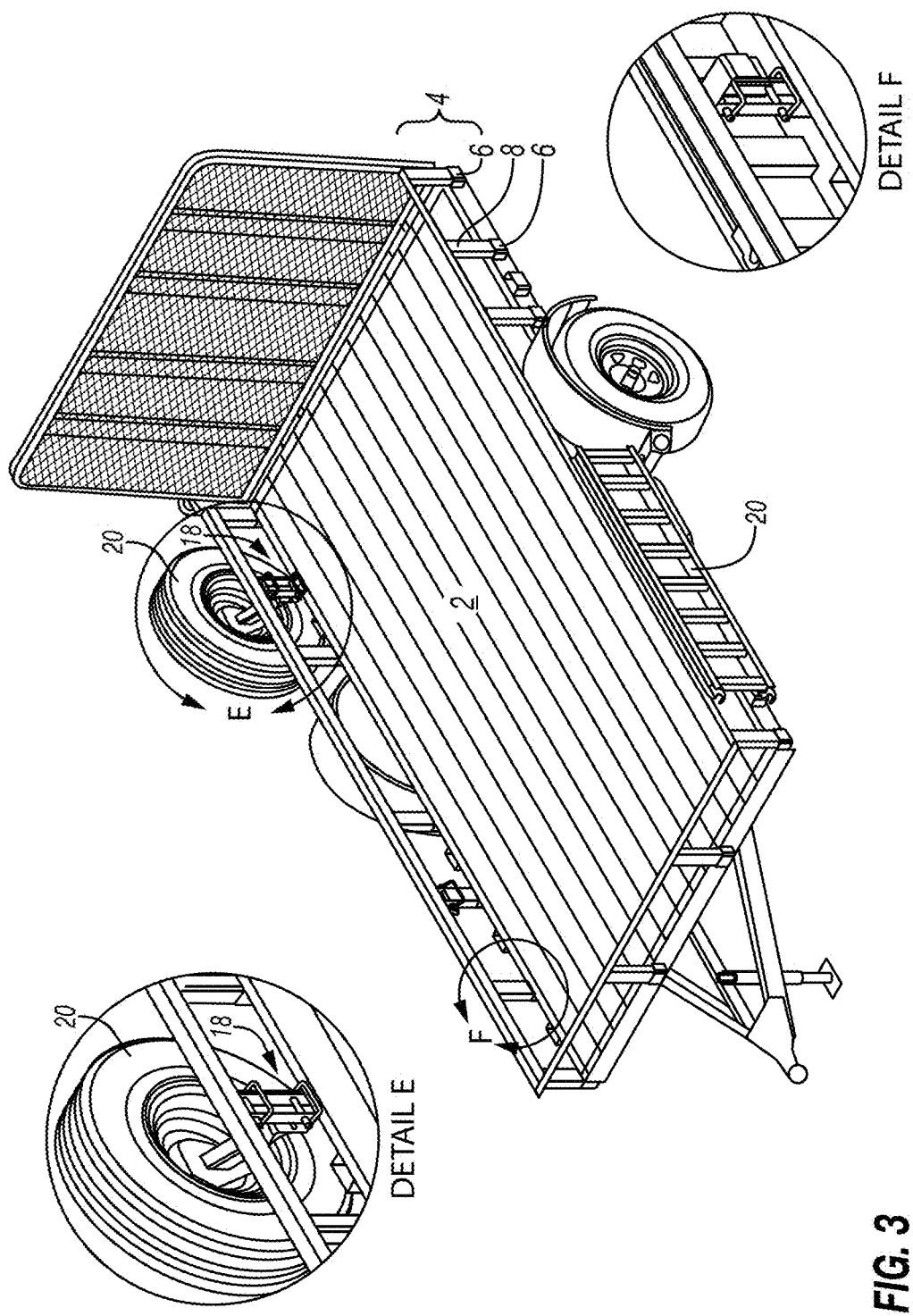
Figure 4:
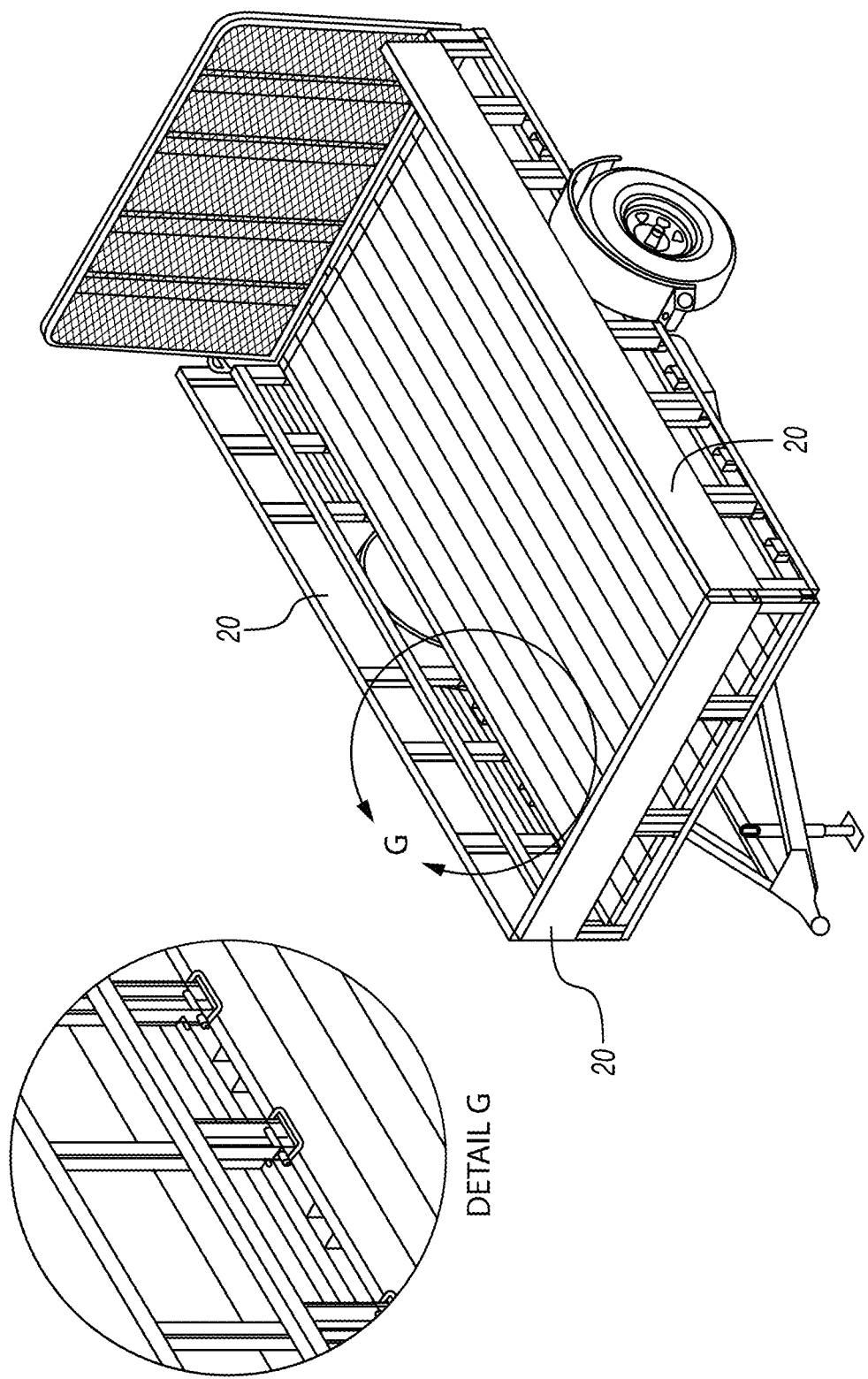
Figure 7A:
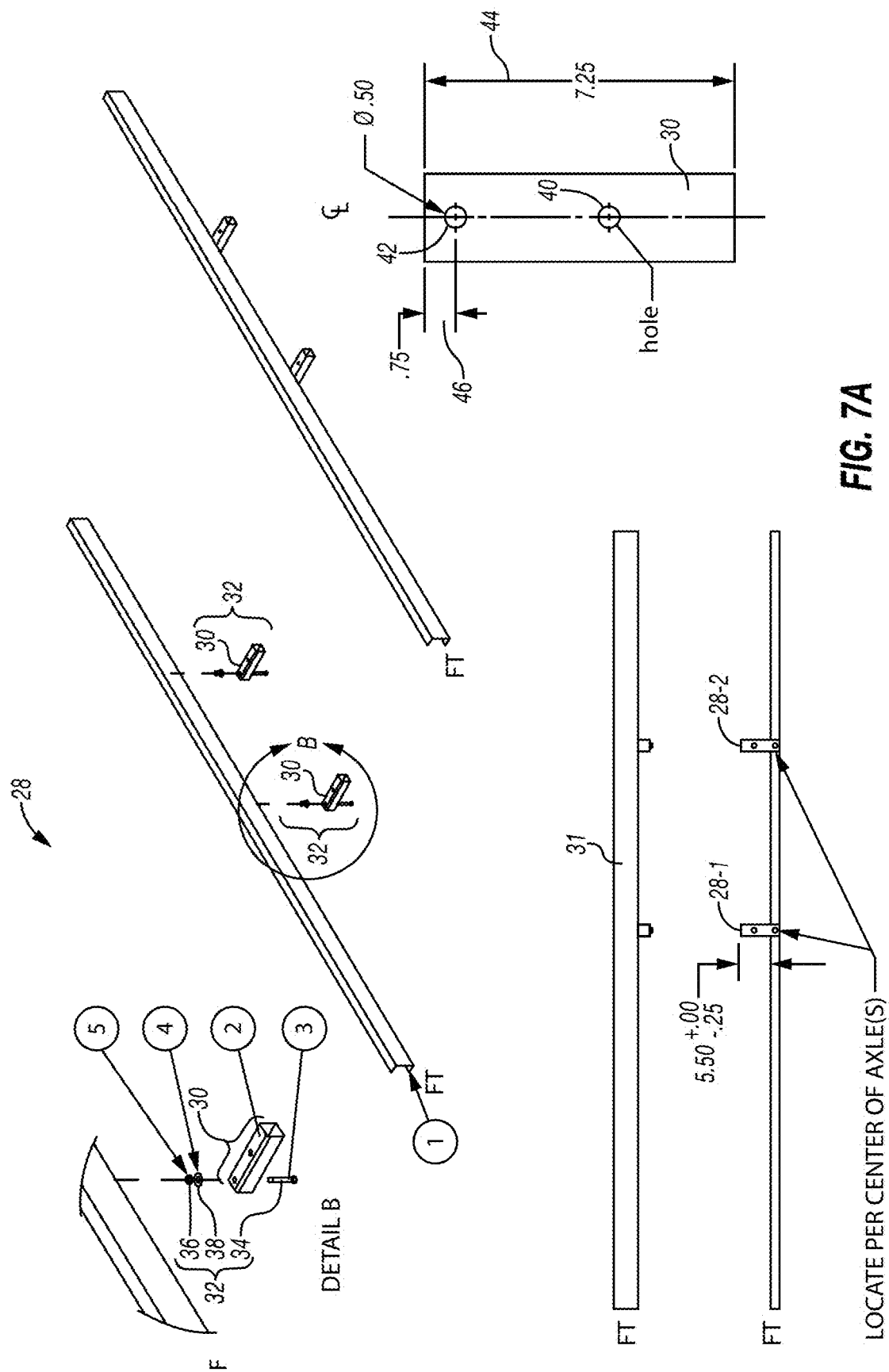
FIG. 7A depicts various aspects of fenders and fender mounting systems, in accordance with various embodiments.

With renewed reference to FIGS. 1A, 3, and 6, as well as FIG. 7A-B, the trailer system 4 may comprise one or more fender mounting system 28. A fender mounting system 28 may comprise an attachment mechanism whereby a fender 31 is selectably connectable to the trailer body 2. For example, during transportation of the trailer system 4 it may be desirable to disconnect a fender 31 from the trailer body 2, so that the footprint of the trailer system 4 may be decreased in size, facilitating more compact transportation, such as in a container, or nested inside other trailer(s), or stacked with other trailers, as shown in FIG. 7B. A fender may be coupled to the trailer by multiple fender mounting systems for enhanced security. For instance, a fender 31 may be associated with both a first fender mounting system 28-1 and a second fender mounting system 28-2.

Figure 22:
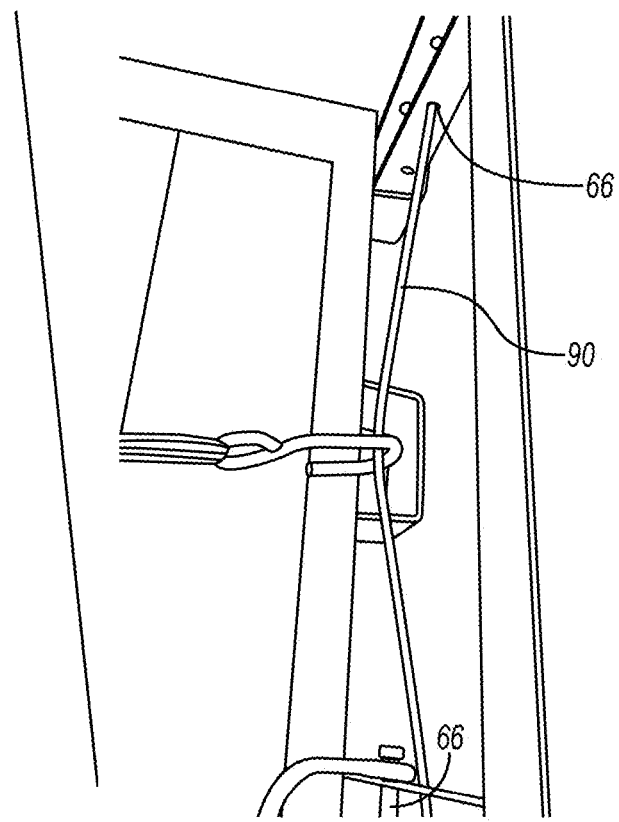
FIGS. 22-23 depict a cable fence, in accordance with various embodiments.
Figure 23:
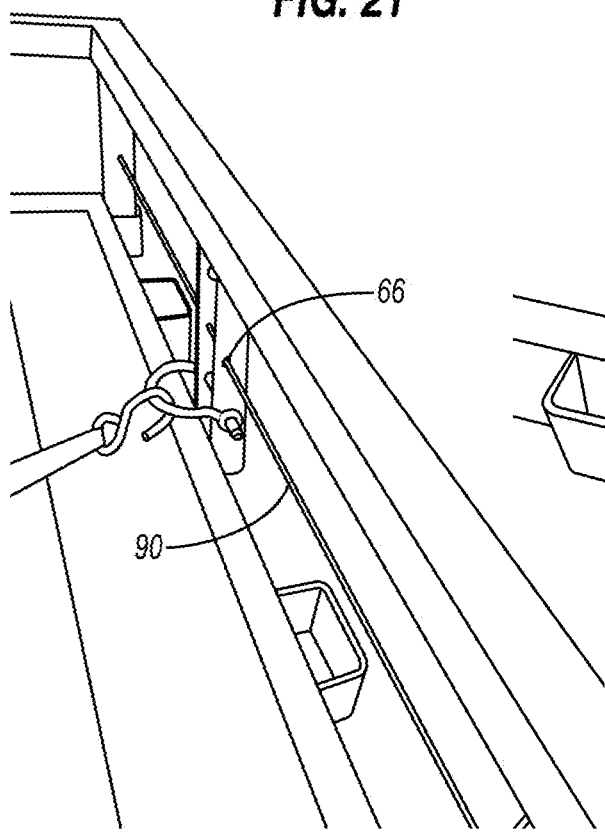
Figure 24:
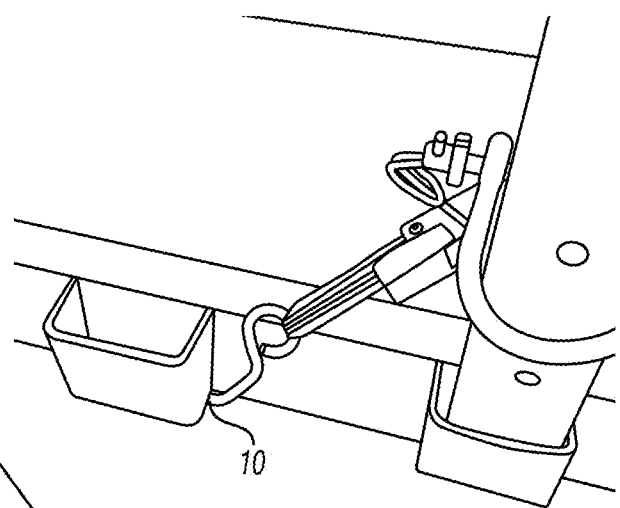
FIG. 24 depicts an accessory upright pocket, in accordance with various embodiments.
Figure 25:
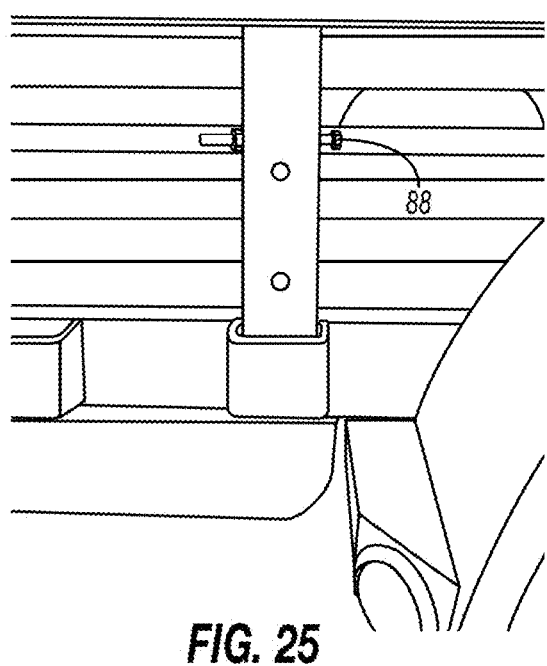
FIG. 25 depicts a tie down system including a bolt, in accordance with various embodiments.
Figure 26:
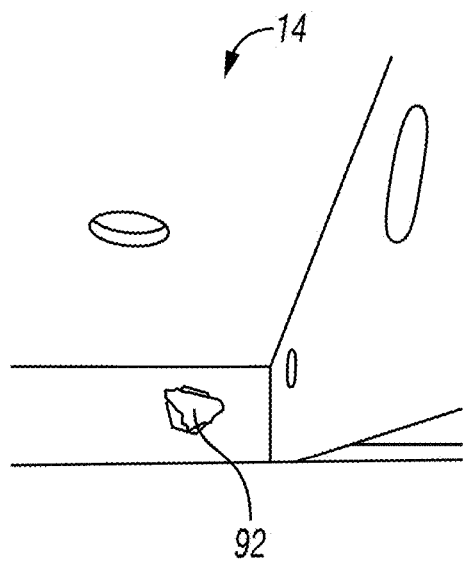
FIG. 26 depicts aspects of an upright, in accordance with various embodiments.

Turning now to FIGS. 22-23, the trailer system 4 may comprise one or more cable fence 90. A cable fence 90 may comprise a rope, cable, strap, or the like joined to an accessory mounting system 18 to provide a fence around at least a portion of the trailer body 2. For instance, the cable fence 90 may be parallel to the peripheral wall formed by the modular rails 8. The cable can be inserted through the side upright apertures 66 (FIGS. 5A-B, 6, 8, 21, 22, 23) defined through each of a plurality of uprights 14 (FIGS. 2, 5, 6, 8, 26, 27, 30) of a modular rail (FIG. 1, 3, 5, 6).

Figure 28:
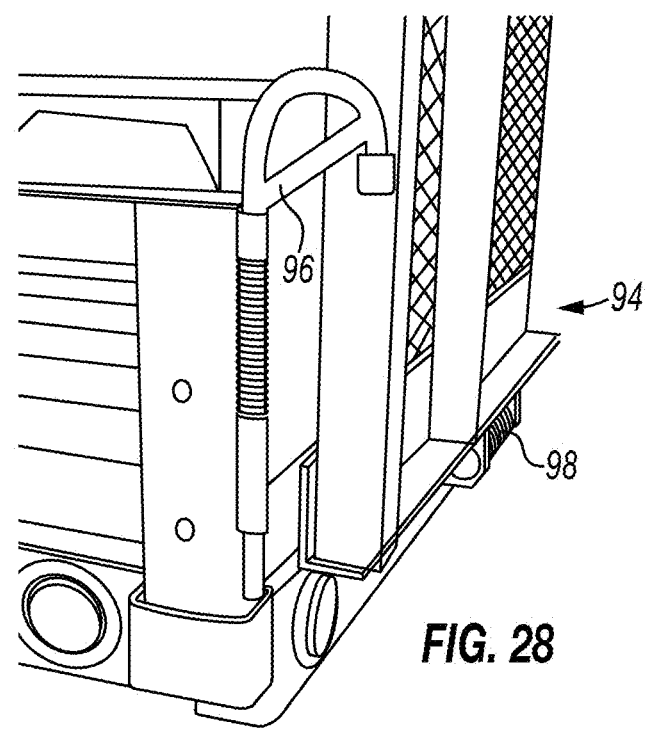
FIG. 28 depicts a mountable accessory including a modular ramp, in accordance with various embodiments.

As illustrated in FIG. 28, the trailer system 4 may comprise a modular ramp 94. A modular ramp 94 may comprise an articulating side wall of the trailer that can be selectably lowered to provide a ramp facilitating the loading of cargo and may be selectably raised to provide a side wall to prevent the unwanted dislodging of the cargo.

Finally, and with additional reference to FIGS. 31-58, the trailer system 4 may include mountable accessories 20. A mountable accessory 20 comprises a structure attachable to the trailer system 4 via the accessory mounting system 18. The mountable accessory 20 is readily attachable and detachable as desired. Consequently, a variety of different mountable accessories 20 are contemplated, as will be discussed further herein.

With reference now to FIGS. 1A, 1D, 2, 3, 5, 6, 8, 24, and 27, an upright pocket 6 is further detailed. In various embodiments, an upright pocket 6 may comprises an accessory upright pocket 10. Furthermore, an upright pocket 6 may comprises a modular rail upright pocket 12. Consequently, a variety of different upright pockets 6, for instance, both accessory upright pockets 10 and modular rail upright pockets 12 may be a part of the trailer system 4. For instance, accessory upright pockets 10 and modular rail upright pockets 12 may be positioned along sides of the trailer body 2 in an alternating pattern. However, any orientation, or pattern, or a variety of different orientations and patterns is possible.

An accessory upright pocket 10 comprises a formed structure defining an aperture disposed on a side of the trailer body 2 and configured to receive another member. For instance, the accessory upright pocket 10 may be sized to receive a wooden board, such as a 2×4 board, so that wooden side panels or other structures may be built onto the trailer body 2. An accessory upright pocket 10 may be sized to receive a clip or a chain or a rope or a hook or any other member, such as to facilitate securement of loads to the trailer.

A modular rail upright pocket 12 may comprised a formed structure defining an aperture disposed on a side of the trailer body 2 and configured to receive an upright 14 of a modular rail 8. Thus, the modular rail upright pocket 12 may interoperate with the modular rail 8 to retain the modular rail 8 in connection to the trailer body 2.

A modular rail 8 comprises further aspects. Turning now to FIGS. 1A-B, 2, 3, 5, 6, 8, 26, 27, and 30, a modular rail 8 may comprise a top rail 16 and a plurality of uprights 14 joined perpendicularly to the top rail 16. The top rail 16 may comprise bar stock, or angle iron, or any linear structure extending parallel to the side of the trailer body 2 along a length of the side. The top rail 16 is supported by the plurality of uprights 14, each insertable into a modular rail upright pocket 12 and extending upwardly from the trailer body 2 and supporting the top rail 16. With specific reference to FIG. 1B, in embodiments omitting upright pockets 12, the top rail 16 may be supported by hard-mounted supports 15 rather than uprights 14.

An accessory mounting system 18 also comprises further aspects. With emphasis on FIGS. 3, 5A-B, 6, 8, and 21-23, an accessory mounting system 18 may comprise one or more aperture defined through one or more aspect of the trailer system 4 and configured to mechanically join an accessory in selectable fixed mechanical communication with the trailer body 2. For example, an accessory mounting system 18 may comprises an upright side aperture 66, an upright web aperture 68, and/or a mountable channel 48. For instance, an upright 14 may have a pair of side portions and a web portion joining the side portions. An aperture may be defined through a side portion forming an upright side aperture 66. An aperture may be defined through the web portion forming an upright web aperture 68. One or more upright web aperture 68 and/or upright side aperture 66 may align to permit insertion of a pin or bolt through multiple such upright side apertures 66 and/or upright web aperture 68 simultaneously, such as to retain an article in connection to the upright 14.

An accessory mounting system 18 may also comprise a mountable channel 48. A mountable channel 48 may comprise a formed metal structure with corresponding apertures alignable with one or more upright side aperture 66 or upright web aperture 68, whereby a pin or bolt may be inserted, holding the mountable channel 48 in fixed connection with the upright 14. The mountable channel 48 may be shaped to correspond to the upright 14 and to nest over at least a portion of the upright 14 in mechanical contact. An accessory may be affixed to the mountable channel 48. In this manner, accessories may be mounted to the uprights 14. Thus, an accessory mounting system 18 receives an accessory in selectable mountable connection with the upright 14.

Figure 5A:
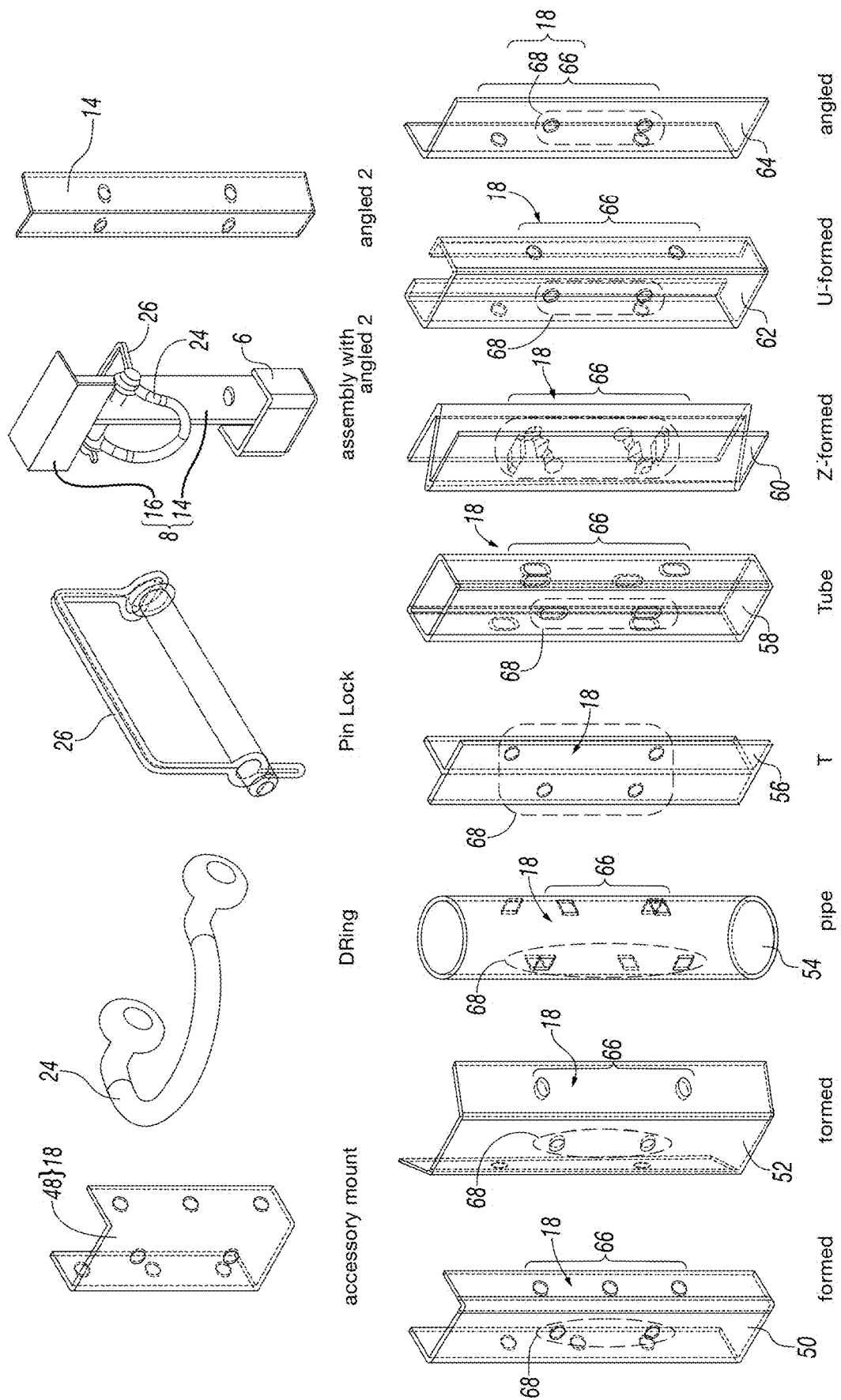
FIG. 5A depicts example aspects of an accessory mounting system and tie down system, in accordance with various embodiments.
Figure 15:
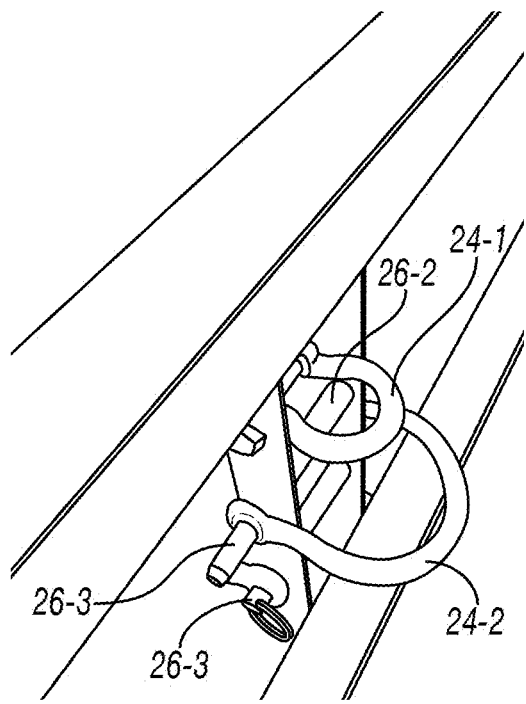
Figure 17:
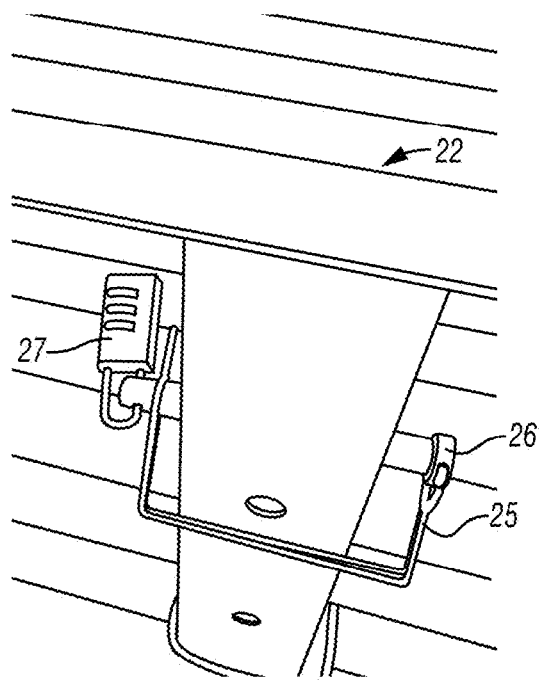
FIGS. 17-20 depict various trailer system aspects including yet further aspects of a tie down system, in accordance with various embodiments.
Figure 18:
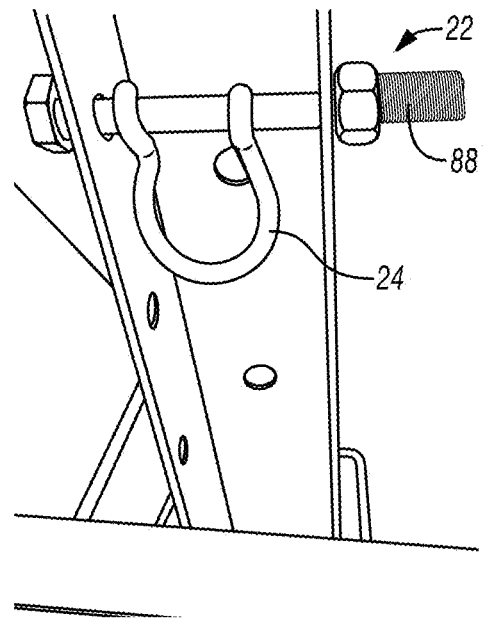
Figure 19:
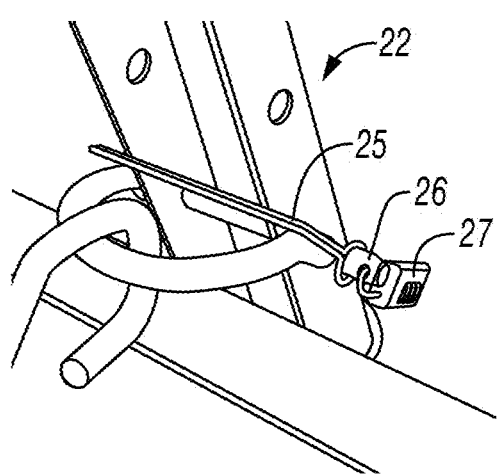
Figure 20:
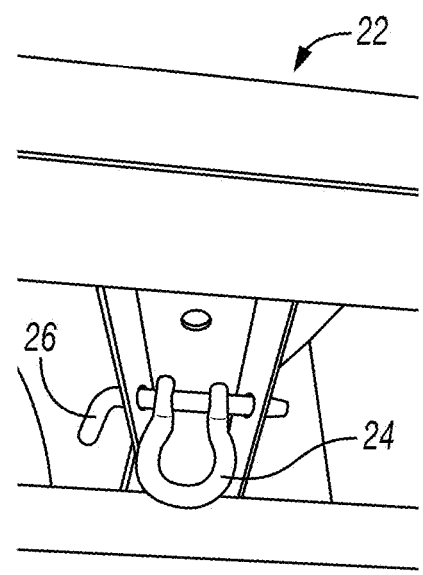
Figure 21:
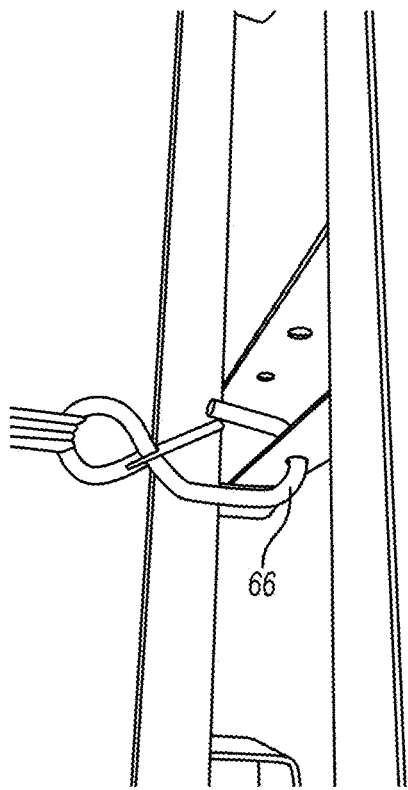
FIG. 21 depicts an upright aperture, in accordance with various embodiments.

With reference now to FIGS. 1A, 5A-B, 9-20, and 25, a tie down system 22 may comprise a tie down ring 24 mountable to an upright 14 by a tie down pin 26, or a bolt 88. FIGS. 5B and 15 show that multiple tie down rings 24 may be mountable to a single upright 14, such as a first tie down ring 24-1 with first tie down pin 26-1, a second down ring 24-2 with second tie down pin 26-2 and a third tie down ring 24-3 with third tie down pin 26-3. The tie down pin 26 or bolt 88 may extend between side portions of the upright 14 providing an axis about which the tie down ring 24 may articulate. The tie down pin 26 or bolt 88 of the tie down system 22 is inserted into a first upright side aperture 66 and a second upright side aperture 66 and a tie down ring 24 is joined in rotatable mechanical communication to the tie down pin 26 and positioned medially between the first and second upright side apertures 66 (see first tie down ring 24-1), or distally about the first and second upright side apertures 66 (see second tie down ring 24-2). The tie down ring 24 may extend away from the axis in a C shape, or U shape, or similar open shape, except that the open portion of the shape is closed by the tie down pin 26 or bolt 88. The tie down ring 24 may extend inwardly toward the center of the trailer body 2 (see first tie down ring 24-1 and second tie down ring 24-2) or outwardly away from the trailer body 2 (see third tie down ring 24-3). Thus, the combination of the tie down ring 24 and the tie down pin 26/bolt 88 may form an aperture configured to receive a rope, hook, clip, cable, or other tie down mechanism to retain a load being carried on the trailer body 2. In various embodiments, the tie down pin 26 is fixed in position with a pin clip 25 and/or a lock 27. Thus, the tie down system 22 may be semi permanently fixed (such as by a bolt 88), or may be securely fixed against removal or theft (such as by a lock 27) or may be rapidly and readily removed and repositioned (such as by a tie down pin 26).

Figure 29:
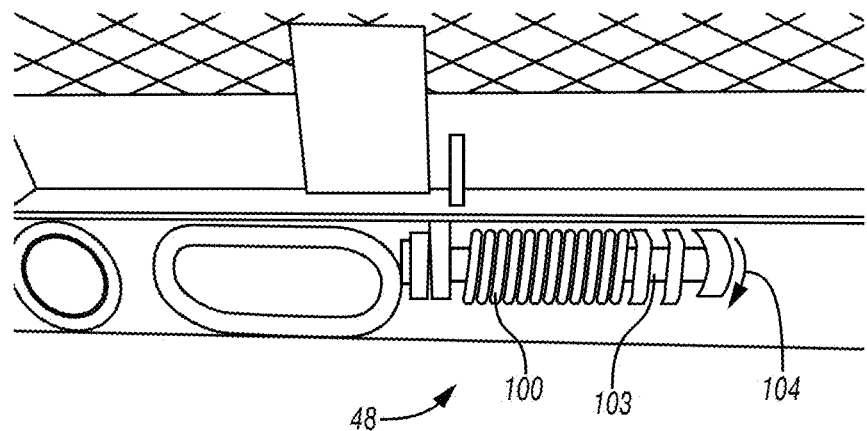
FIG. 29 depicts a mountable accessory including a lift assistance system, in accordance with various embodiments.

A modular ramp 94 shown in FIGS. 28-29. The modular ramp 94 comprises a spring loaded closure 96 and a lift assistance system 98. A spring loaded closure 96 comprises a biased latching member configured to latch the modular ramp 94 in a closed position and biased toward closure, whereby the unwanted unlatching of the latching member is ameliorated. The lift assistance system 98 comprises a force exerting member configured to diminish the effort required to lift the modular ramp 94 to the closed position. More specifically, the lift assistance system 98 comprises a spring 100, an axis member 102, and a pin 104. The spring 100 is disposed helically about the axis member 102. A pin 104 inserts through the axis member 102 to retain it to the trailer body 2. As the modular ramp 94 opens and closes, the spring 100 is tensioned and untensioned, respectively. As such, the spring 100 provides a force configured to diminish the effort required to lift the modular ramp 94 to the closed position.

With renewed focus on the modular rail 8, particularly uprights 14, and with focus on FIGS. 1A, 3, and 5A-B, one may appreciate that uprights 14 may be provided in a variety of upright types, each having various shapes and structures. For example, a u-channel upright 50 may comprise a U-shaped profile, a cup-channel upright 52 may have a cup-shaped profile, a tubing upright 54 may have a cylindrical profile, a T-shaped upright 56 may have a T-shaped profile, a square tubing upright 58 may have a closed trapezoidal shape profile, a z-channel upright 60 may have a Z-shaped profile, a c-channel upright 62 may have a c-shaped profile, and an angle iron upright 64 may have an L-shaped profile. Thus, the uprights 14 may comprise various configurations and in various embodiments, different uprights 14 may be implemented together and in different orders.

Figure 27:
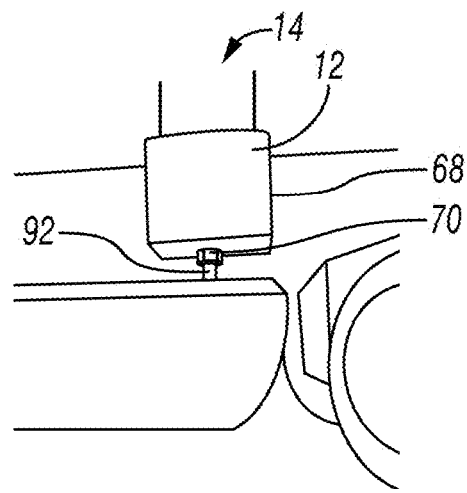
FIG. 27 depicts aspects of a modular rail upright pocket, in accordance with various embodiments.

With reference to FIG. 27, each upright 14 may further comprise an upright mounting bolt 92. An upright mounting bolt 92 may comprise a bolt extending from the bottom of the upright 14, or from a side of the upright 14. The bolt may be permanently fixed to the upright 14, such as by welding, as in the case of a bolt extending from the bottom of the upright 14, or may be removable from the upright 14, such as in the case of a bolt extending from the side of the upright 14. The upright mounting bolt 92 aligns with an end aperture 70 of the modular rail upright pocket 12, where it may be joined by a nut to hold the upright 14, and correspondingly, the modular rail 8, in fixed attachment to the trailer system 4.

Figure 30:
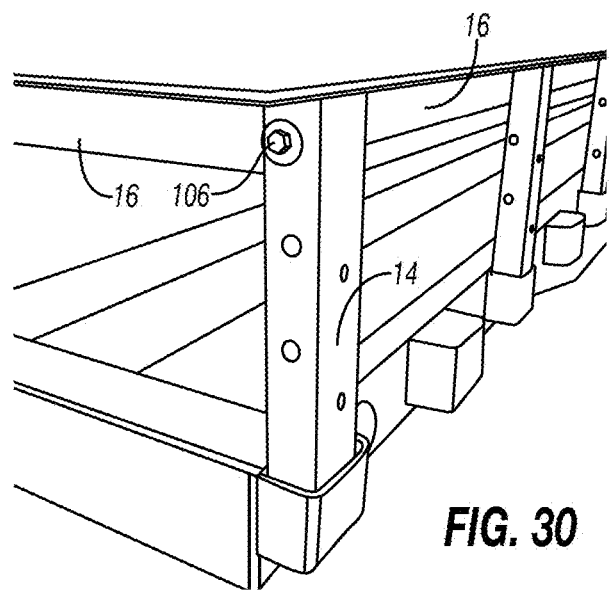
FIG. 30 depicts a mountable accessory including a corner interface, in accordance with various embodiments.
Figure 31:
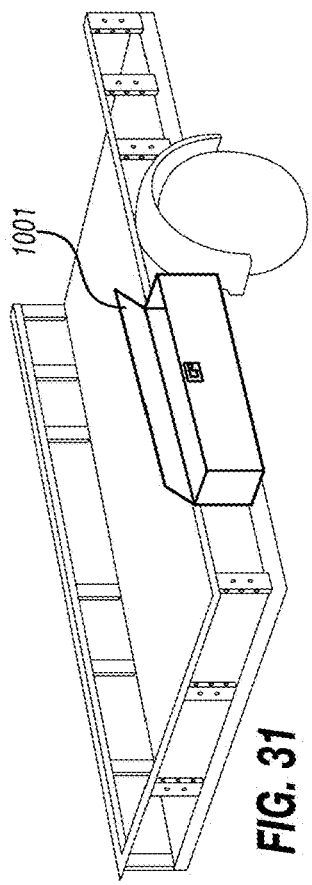
FIG. 31 depicts a mountable accessory including a side mount tool box, in accordance with various embodiments.
Figure 32:
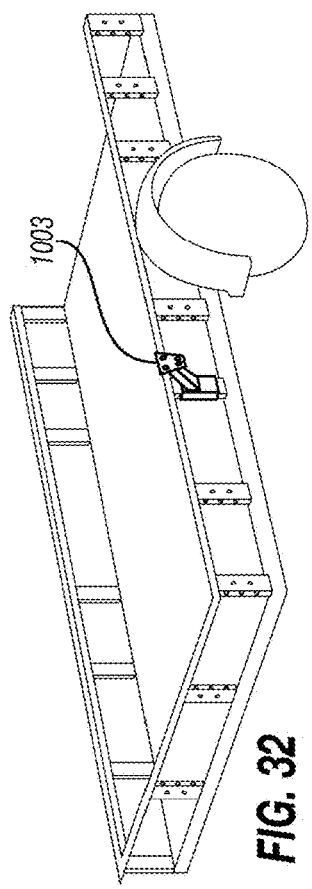
FIG. 32 depicts a mountable accessory including a spare tire mount, in accordance with various embodiments.
Figure 33:
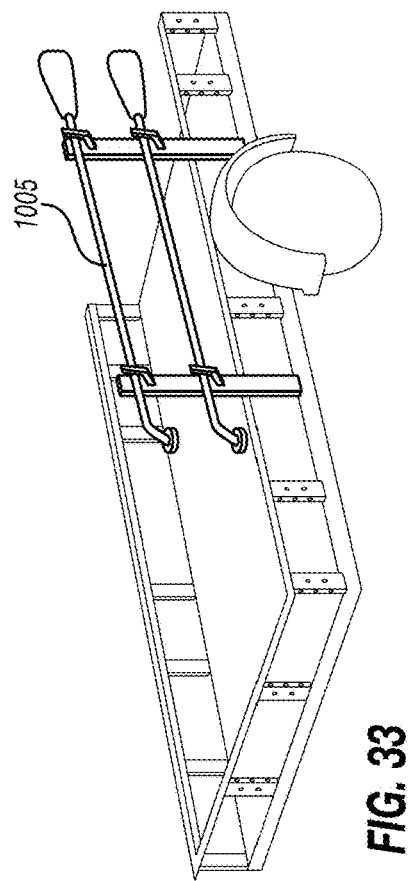
FIG. 33 depicts a mountable accessory including a trimmer rack, in accordance with various embodiments.
Figure 34:
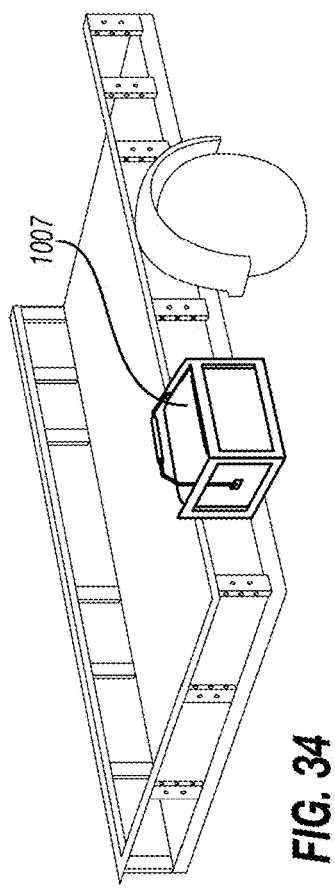
FIG. 34 depicts a mountable accessory including a cooler rack, in accordance with various embodiments.
Figure 36:
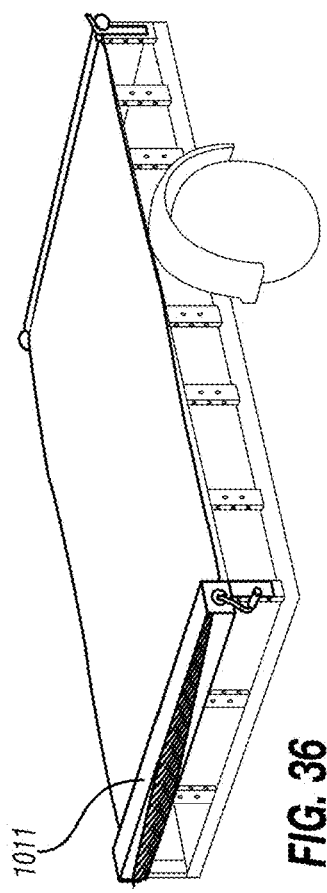
FIG. 36 depicts a mountable accessory including a tarp kit, in accordance with various embodiments.
Figure 38:
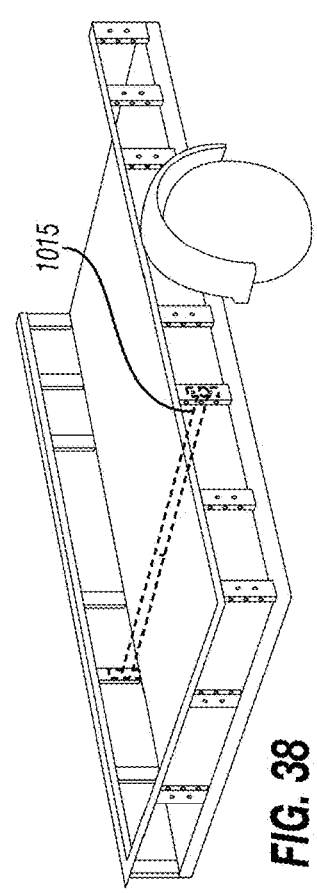
FIG. 38 depicts a mountable accessory including a cargo bar, in accordance with various embodiments.
Figure 35:
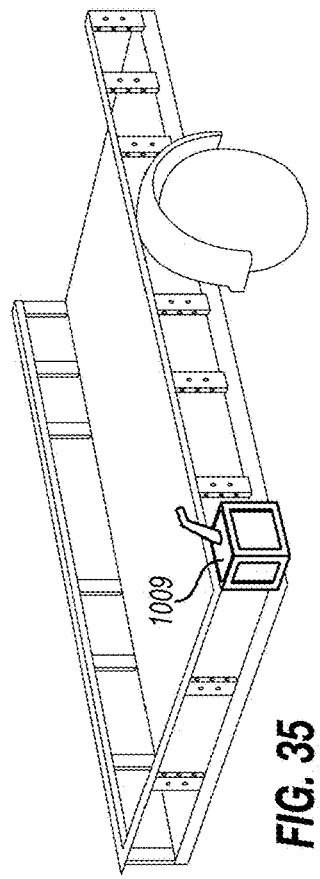
FIG. 35 depicts a mountable accessory including a cargo bar, in accordance with various embodiments.
Figure 37:
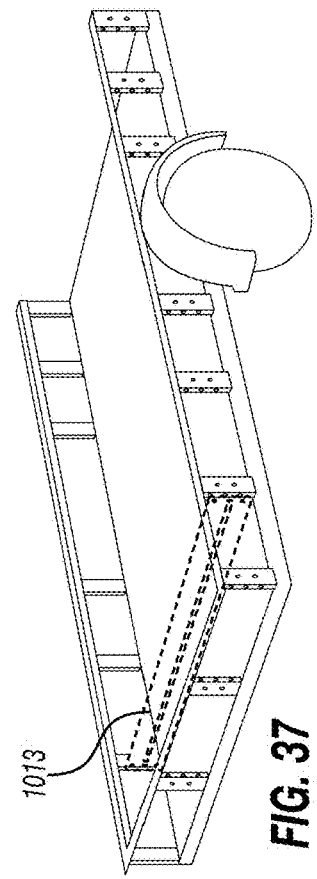
FIG. 37 depicts a mountable accessory including a bed divider, in accordance with various embodiments.
Figure 39:
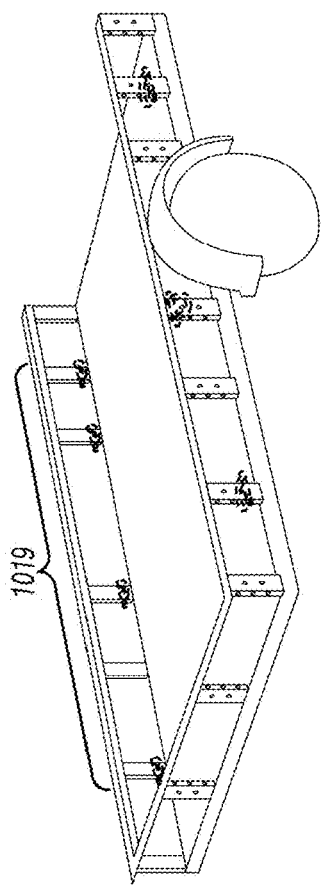
FIG. 39 depicts a mountable accessory including a winch plate, in accordance with various embodiments.
Figure 40:
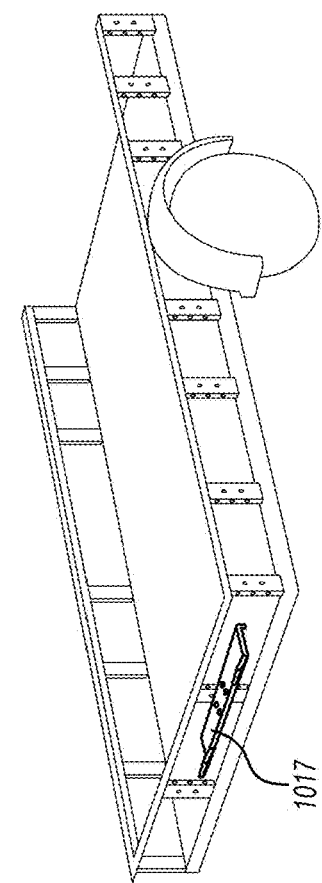
FIG. 40 depicts a mountable accessory including d-rings, in accordance with various embodiments.
Figure 41:
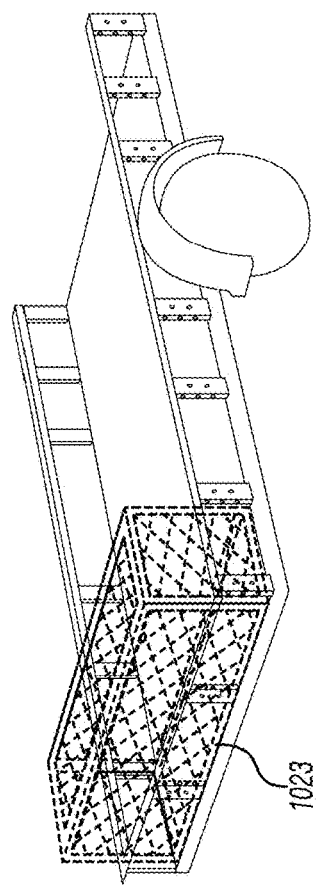
FIG. 41 depicts a mountable accessory including a grill, in accordance with various embodiments.
Figure 42:
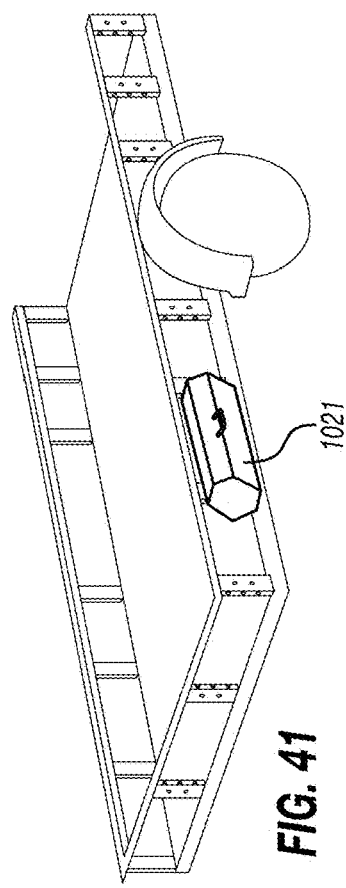
FIG. 42 depicts a mountable accessory including a front landscaping box, in accordance with various embodiments.
Figure 43:
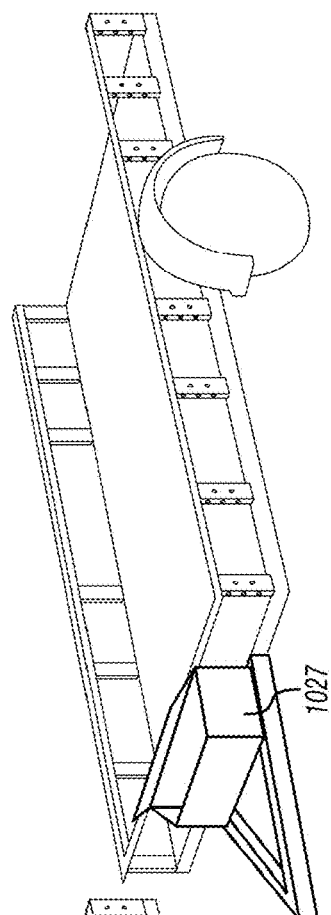
FIG. 43 depicts a mountable accessory including a side box, in accordance with various embodiments.
Figure 44:
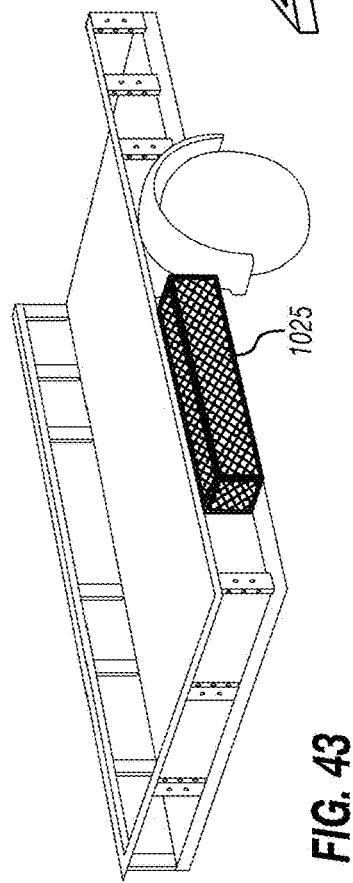
FIG. 44 depicts a mountable accessory including a tongue toolbox, in accordance with various embodiments.
Figure 45:
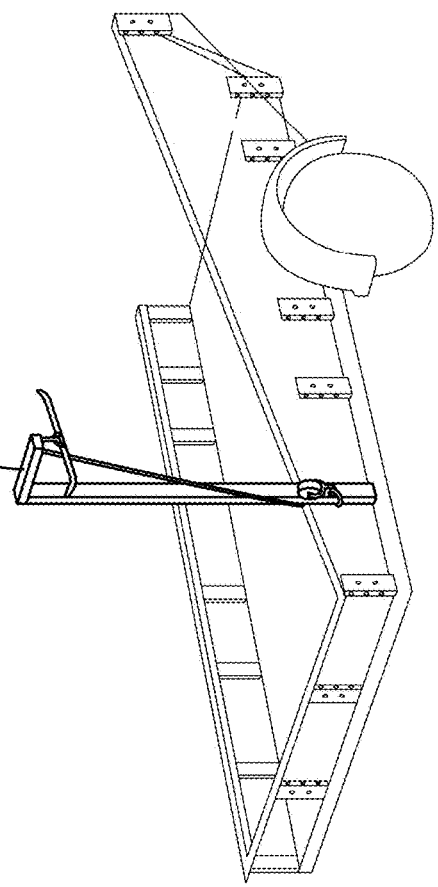
FIG. 45 depicts a mountable accessory including a diesel tank, in accordance with various embodiments.
Figure 46:
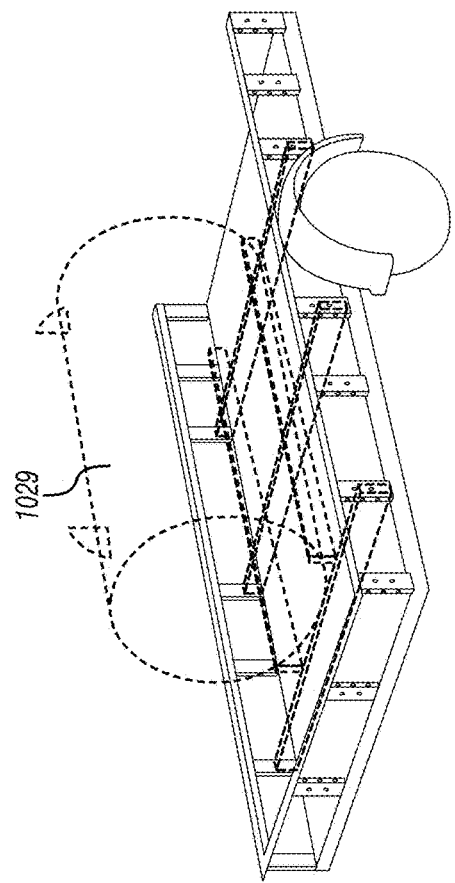
FIG. 46 depicts a mountable accessory including a deer hoist, in accordance with various embodiments.
Figure 47:
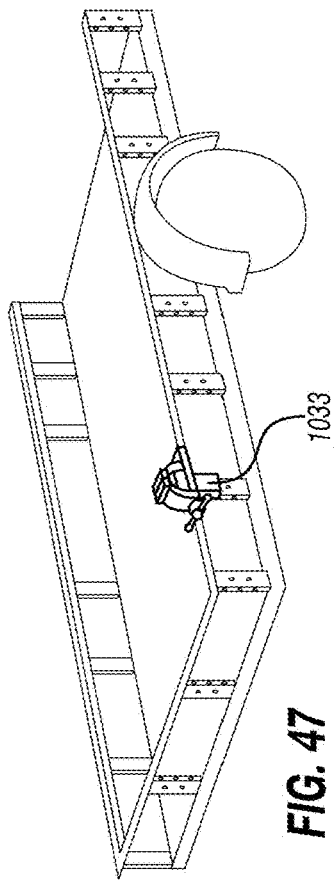
FIG. 47 depicts a mountable accessory including a bench vice, in accordance with various embodiments.
Figure 48:
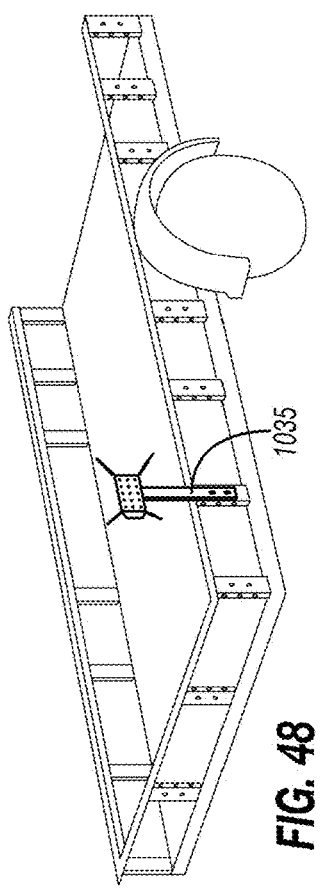
FIG. 48 depicts a mountable accessory including a work light, in accordance with various embodiments.
Figure 49:
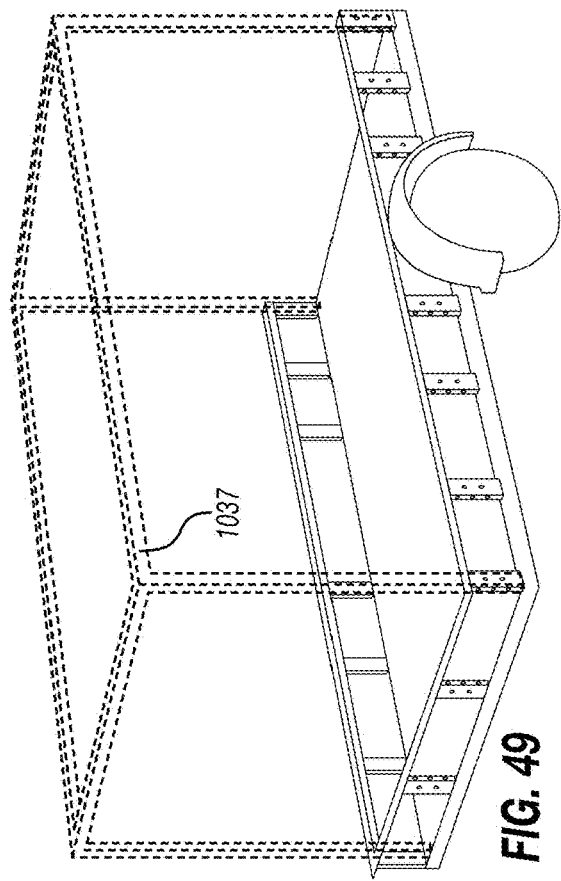
FIG. 49 depicts a mountable accessory including an utility rack, in accordance with various embodiments.
Figure 50:
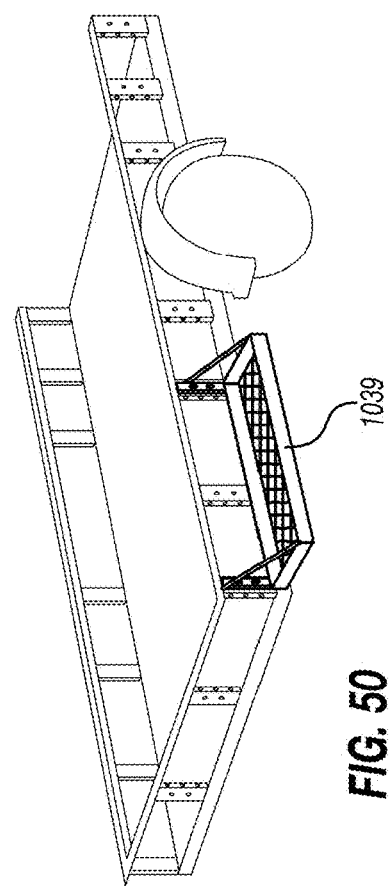
FIG. 50 depicts a mountable accessory including a fold down tray, in accordance with various embodiments.
Figure 51:
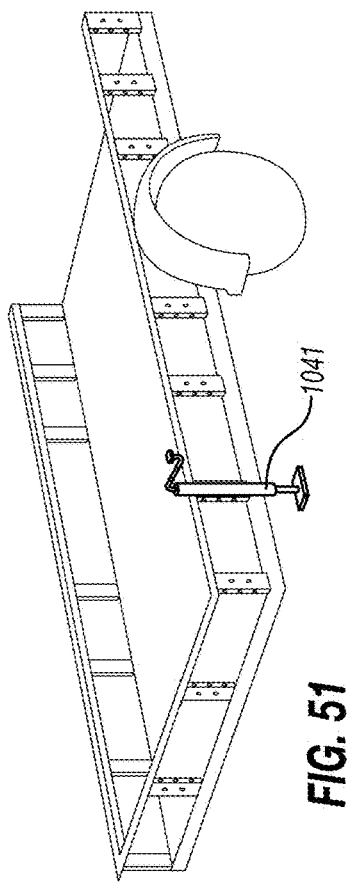
FIG. 51 depicts a mountable accessory including a stabilizer jack, in accordance with various embodiments.
Figure 52:
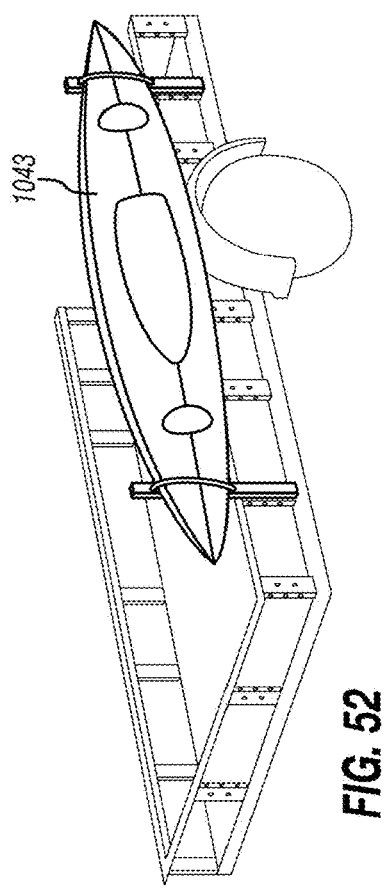
FIG. 52 depicts a mountable accessory including a kayak rack, in accordance with various embodiments.
Figure 53:
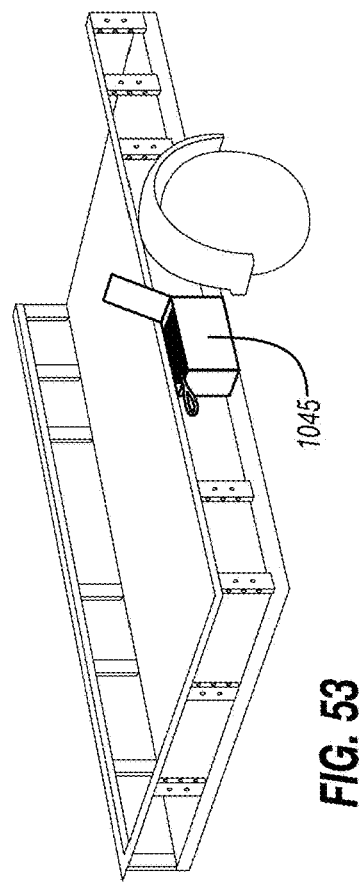
FIG. 53 depicts a mountable accessory including a fryer, in accordance with various embodiments.
Figure 54:
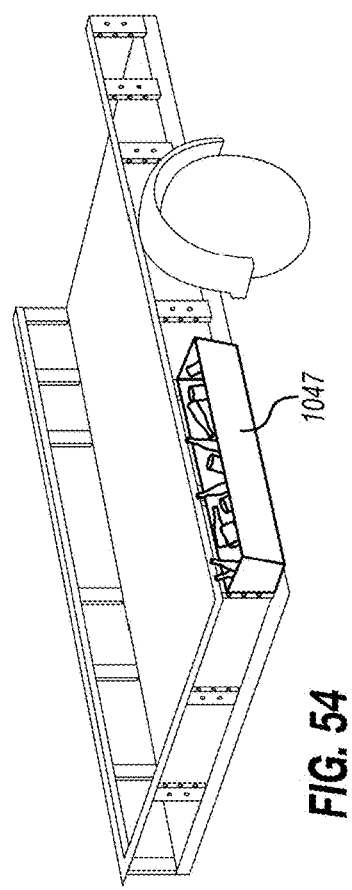
FIG. 54 depicts a mountable accessory including a beverage trough, in accordance with various embodiments.
Figure 55:
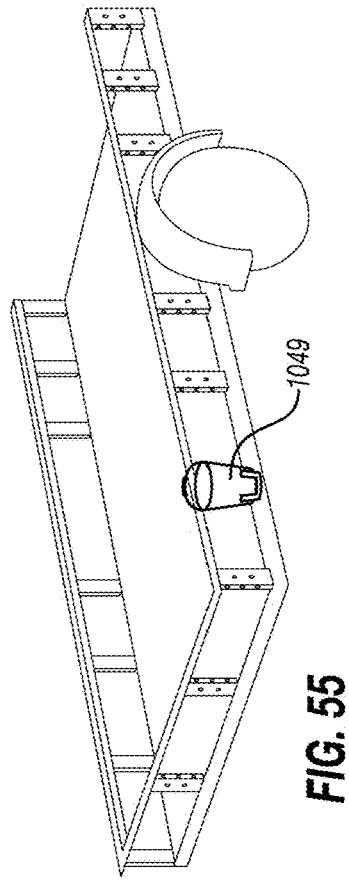
FIG. 55 depicts a mountable accessory including a grill mount, in accordance with various embodiments.
Figure 56:
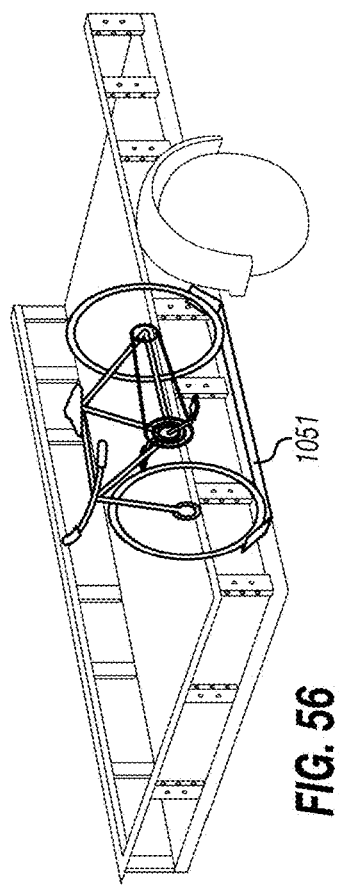
FIG. 56 depicts a mountable accessory including a bicycle rack, in accordance with various embodiments.
Figure 57:
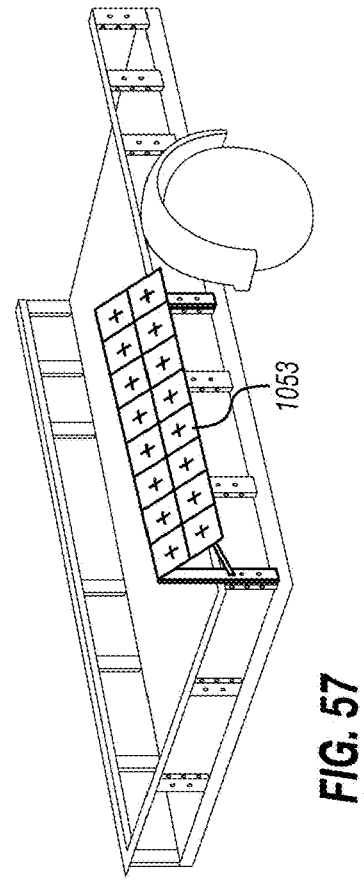
FIG. 57 depicts a mountable accessory including solar panels, in accordance with various embodiments.

Continuing in reference to the modular rail 8, the top rail 16 may comprise a corner interface 106, such as illustrated in FIG. 30. A corner interface 106 may comprise an aperture through the top rail 16 at a distal end of the top rail 16 and positioned to align with a corresponding corner interface 106 of an abutting top rail 16. In this manner, a fastener such as a bolt or pin may be inserted through the corresponding corner interfaces 06 and the top rails joined together.

With renewed focus on the tie down system 22, and particularly, the tie down ring 24, attention is directed to FIGS. 16A-C. A tie down ring 24 may have various features. For example, a tie down ring 24 may comprise a curved member 80 lying in a curved member plane 72, a pair of attachment members 82, each comprising a pin aperture 78 and both lying in a shared attachment member plane 76, and a bend angle 74. An offset distance 84 may extend between the curved member plane 72 and the attachment member 82 plane. An aperture width 86 may extend between the two attachment members 82. The aperture width 86 may be sufficient to permit the tie down ring 24 to receive an upright 14 into the space between the pair of attachment members 82. This aperture width 86, in conjunction with the bend angle 74 and offset distance 84, enables the tie down ring 24 to lie flat against the trailer body 2 as in FIG. 12, as well as flat against the upright 14, as in FIG. 11.

The curved member 80 comprises an arcuate portion of the tie down ring 24. The curved member 80 may form a full semi-circle. In further embodiments, the curved member 80 has arcuate and linear portions. For instance, a central arc may terminate in tangential linear portions extending outwardly away from a trough of the arc.

The bend angle 74 may be disposed interstitially between the curved member 80 and an attachment member 82. The bend angle 74 may transition the tie down ring 24 from the portion lying in the curved member plane 72, to a portion not lying in the curved member plane 72 but instead lying in a shared attachment member plane 76. In various embodiments, the bend angle 74 comprises a curve lying in an orthogonal dimension from the curve of the curved member 80.

The attachment members 82 each comprise distal ends of the tie down ring 24. In various embodiments, an attachment member 82 comprises an annular structure defining a pin aperture 78. The pin aperture 78 is shaped to receive a tie down pin 26 or a bolt 88 to hold the tie down ring 24 in connection to an upright 14.

Figure 11:
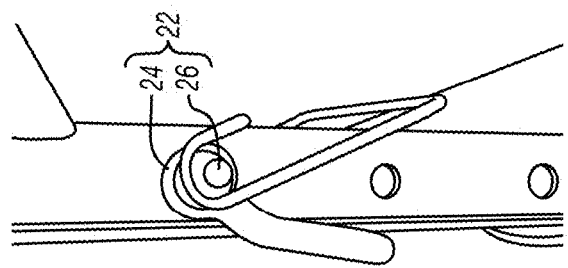
FIGS. 9-15 depict various trailer system aspects including further aspects of a tie down system, in accordance with various embodiments.
Figure 9:
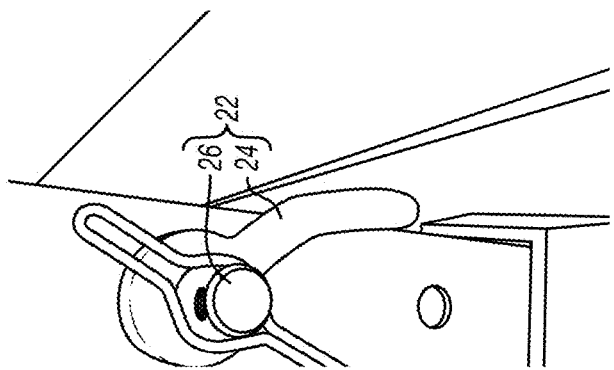
Figure 10:
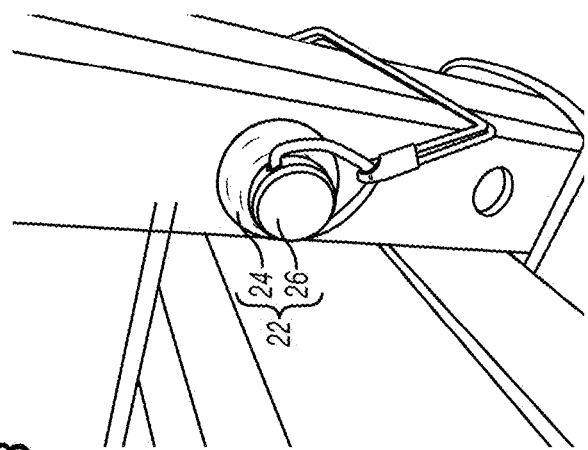
Figure 8:
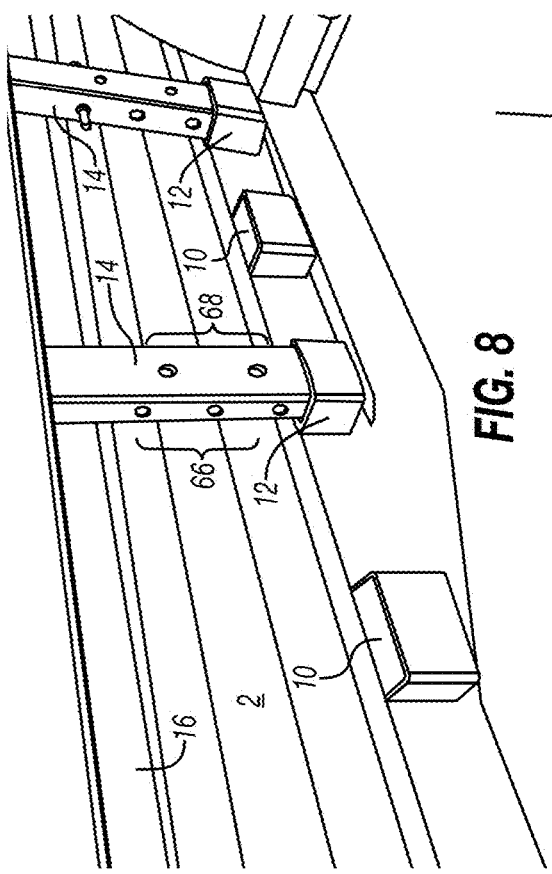
FIG. 8 depicts a side view of a portion of a trailer, in accordance with various embodiments.
Figure 12:
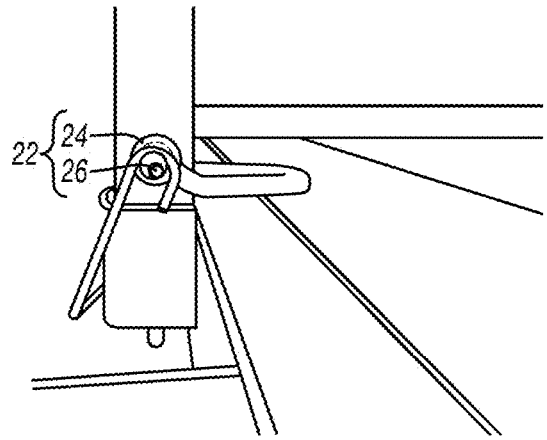
Figure 13:
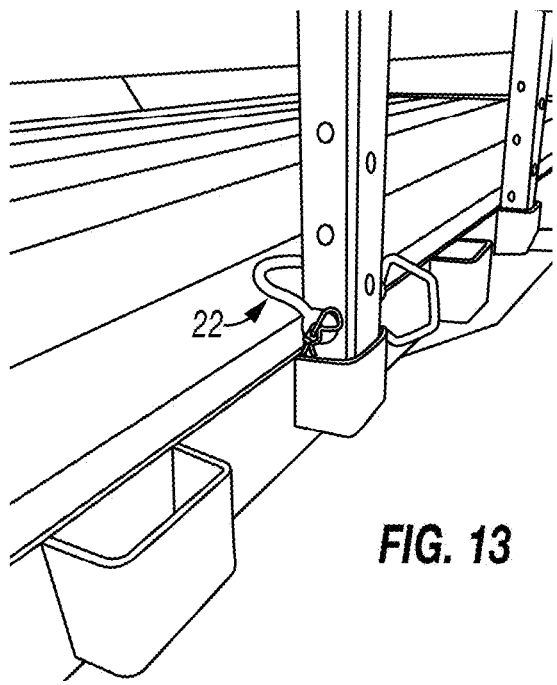
Figure 14:
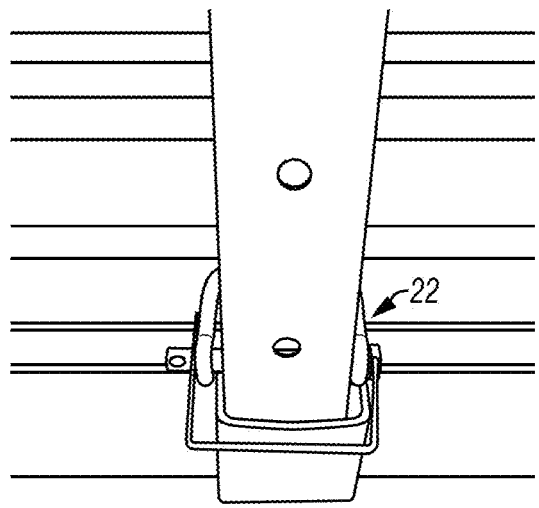

Finally, an offset distance 84 comprises a distance extending orthogonally from the curved member plane 72 to a shared axis running through both pin apertures 78. The offset distance 84 is selected to accommodate the positioning of the upright side apertures 66 of the accessory mounting system 18 that are disposed through the uprights 14 of the modular rail 8. In various embodiments, offset distance 84 comprises one-half the thickness of the uprights 14 of the modular rail 8. Consequently and as shown in FIGS. 11 and 12, the curved member plane 72 may be oriented parallel to the longitudinal orientation of the upright 14 so that the curved member 80 of the tie down ring 24 lies flat against the upright 14 and/or the trailer body 2, depending on the orientation of the tie down ring 24.

With reference now to FIGS. 7A-B, a fender mounting system 28 is disclosed. The fender mounting system 28 may have a swivel mount tube 30 and a swivel attachment 32. A fender 31 may be attachable to the swivel mount tube 30, which is mounted to the trailer body 2 by a swivel attachment 32. The swivel mount tube 30 comprises a length of metal tubing, for example, square tubing, round tubing, or any tubing as desired and of corresponding shape to receive a stud extending from the fender 31. The swivel mount tube 30 may have a length from end to end, such as depicted by second dimension 44. The swivel attachment 32 provides a rotational axis for the swivel mount tube 30 to rotate. The swivel mount tube 30 is rotatable between extending outwardly from the trailer body 2 (perpendicular from the side of the trailer body 2), in order to receive the stud extending from the fender 31, or another position oriented alongside the trailer body 2 (parallel to the side of the trailer body 2) in order to minimize the area of the profile of the trailer body 2 in preparation for shipping of the trailer body 2. Thus, one may envision that the trailer body comprises an outer perimeter edge defining an outboard body plane, and the swivel mount tube swivels between a first position perpendicular to the outboard body plane and a second position inward of the outboard body plane.

The swivel mount tube 30 may have a variety of features. For instance, a first aperture 40 and a second aperture 42 may be defined through the swivel mount tube 30. The first aperture 40 may be positioned to coincide with the portion of the swivel mount tube 30 that receives the stud extending from the fender 31. Upon insertion of the stud, a corresponding hole in the stud aligns with the first aperture 40, permitting insertion of a bolt, pin, or other fastener to retain the fender 31. The second aperture 42 may be positioned a first distance 46 from an end of the swivel mount tube 30 opposite the end receiving the fender 31. The second aperture 42 thus may be biased toward an opposite end of the swivel mount tube 30 from the fender 31. For example, the first distance 46 may comprise between $\frac{1}{8}^{th}$ and $\frac{1}{10}^{th}$ the second dimension 44. The swivel attachment 32 interfaces with the second aperture 42, attaching the swivel mount tube 30 to the trailer body 2. Because the second aperture 42 is biased toward an end of the swivel mount tube 30, the rotational axis provided by the swivel attachment 32 enables the swivel mount tube 30 to more readily swivel to a position entirely within the profile of the trailer body 2, such as to minimize size during transportation of unassembled trailers.

The swivel attachment 32 may also have a variety of features. The swivel attachment 32 may comprise a bolt, or a pin, or a hinge, or any other mechanism to attach the swivel mount tube 30 to the trailer body 2 but to permit it to articulate in at least one direction. For example, the swivel attachment 32 may comprise a bolt 34, a nut 36, and a washer 38. The bolt may extend from the trailer body 2 upwardly (toward the top rail 16 of a modular rail 8) or downwardly (away from the top rail 16 of a modular rail 8). The bolt may extend through the second aperture 42 and be secured by a nut 36. A washer 38 may provide a platform against which the swivel attachment 32 may be fixable or pivotable, depending on the snugness of the nut 36.

Figure 58:
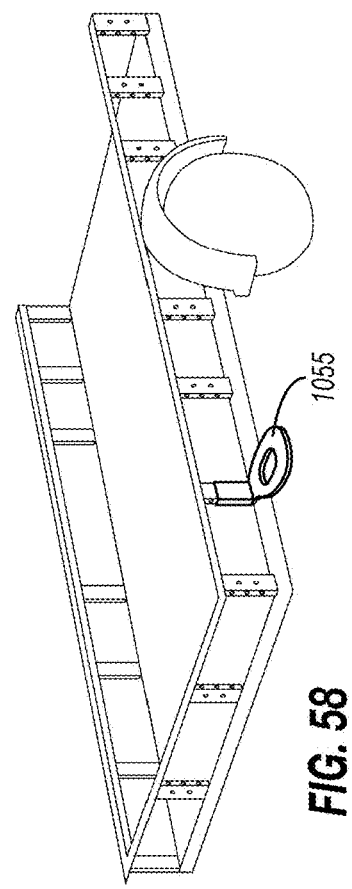
FIG. 58 depicts a mountable accessory including a toilet seat, in accordance with various embodiments.

As briefly mentioned, a trailer system 4 may have many different mountable accessories 20. With reference now to FIGS. 31-58, a variety of example mountable accessories 20 are disclosed. For instance, such accessories may include a side mount tool box 1001 (FIG. 31), spare tire mount 1003 (FIG. 32), trimmer rack 1005 (FIG. 33), cooler rack 1007 (FIG. 34), gas can rack 1009 (FIG. 35), tarp kit 1011 (FIG. 36), bed divider 1013 (FIG. 37), cargo bar 1015 (FIG. 38), winch plate 1017 (FIG. 39), D-rings 1019 (FIG. 40), grill 1021 (FIG. 41), front landscape box 1023 (FIG. 42), side box 1025 (FIG. 43), tongue toolbox 1027 (FIG. 44), diesel tank 1029 (FIG. 45), deer hoist 1031 (FIG. 46), bench vise 1033 (FIGS. 5B and 47), work light 1035 (FIG. 48), utility rack 1037 (FIG. 49), fold down tray 1039 (FIG. 50), stabilizer jack 1041 (FIG. 51), kayak rack 1043 (FIG. 52), fryer 1045 (FIG. 53), beverage trough 1047 (FIG. 54), grill mount 1049 (FIG. 55), bicycle rack 1051 (FIG. 56), solar panels 1053 (FIG. 57), or toilet seat 1055 (FIG. 58).

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but on the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A modular trailer rail assembly comprising:
    a top rail;
    a plurality of uprights joined perpendicularly to the top rail,
    wherein each upright comprises a first pair of side upright apertures comprising a first side upright aperture and a second side upright aperture positioned a first lateral inset distance from a larger upright face and configured to receive a tie down pin of a tie down system;
    the tie down pin of the tie down system inserted into the first side upright aperture and the second side upright aperture; and
    a tie down ring joined in rotatable mechanical communication to the tie down pin and positioned medially between the first side upright aperture and the second side upright aperture.

2. The modular trailer rail assembly according to claim 1, wherein the tie down ring comprises:
    a curved member disposed in a curved member plane; and
    a first attachment member and a second attachment member each comprising pin apertures,
    wherein the first attachment member and the second attachment member are separated by an aperture width and are both disposed in an attachment member plane, and
    wherein the curved member plane and the attachment member plane intersect at a bend angle whereby the first attachment member and the second attachment member are spaced an offset distance from the curved member plane.

3. The modular trailer rail assembly according to claim 2, wherein the curved member of the tie down ring hangs parallel to at least one of the plurality of uprights.

4. The modular trailer rail assembly according to claim 2, further comprising a lock connected to the tie down pin and configured to selectably prevent the tie down pin from being removed from the first side upright aperture and the second side upright aperture.

5. The modular trailer rail assembly according to claim 2, wherein the tie down pin comprises a bolt.

6. The modular trailer rail assembly according to claim 2, further comprising an accessory mounting system configured to receive an accessory in selectably mountable connection with the upright.

7. The modular trailer rail assembly according to claim 6, wherein the accessory mounting system comprises:
   a side upright aperture defined through a side of the upright; and
   a mountable channel shaped to correspond to the upright and configured to nest over at least a first portion of the upright in mechanical contact,
   wherein the mountable channel comprises an aperture alignable with the side upright aperture and configured to receive at least one of a pin and a bolt.

8. The modular trailer rail assembly according to claim 6, wherein the accessory mounting system comprises:
   an upright web aperture defined through a web of the upright extending between two sides of the upright; and
   a mountable channel shaped to correspond to the upright and configured to nest over the web and at least a portion of each of the two sides of the upright,
   wherein the mountable channel comprises an aperture alignable with the upright web aperture and configured to receive at least one of a pin and a bolt.

9. The modular trailer rail assembly of claim 8, wherein the accessory mounting system comprises a mountable accessory selected from a list comprising a spare tire mount, a trimmer rack, a cooler rack, a gas can rack, a tarp kit, a bed divider, a cargo bar, a winch plate, a D-Ring, a grill, a front landscape box, a side box, a tongue toolbox, a diesel tank, a deer hoist, a bench vise, a work light, an utility rack, a fold down tray, a stabilizer jack, a kayak rack, a fryer, a beverage trough, a grill mount, a bicycle rack, a solar panels, and a toilet seat.

10. A modular trailer rail assembly comprising:
    a top rail;
    a plurality of uprights joined perpendicularly to the top rail,
    wherein each upright comprises a first pair of side upright apertures comprising a first side upright aperture and a second side upright aperture positioned a first lateral inset distance from a larger upright face and configured to receive a tie down pin of a tie down system,
    wherein the tie down pin of the tie down system is insertable into the first side upright aperture and the second side upright aperture; and
    a tie down ring is joinable in rotatable mechanical communication to the tie down pin and positionable medially between the first side upright aperture and the second side upright aperture,
    wherein each upright comprises an integrally welded upright mounting bolt extending from a distal end of the upright opposite the top rail and configured to be received by an end aperture of a modular rail mount of a modular rail upright pocket joined to a trailer body.

11. A modular trailer rail assembly comprising:
    a top rail;
    a plurality of uprights joined perpendicularly to the top rail,
    wherein each upright comprises a first pair of side upright apertures comprising a first side upright aperture and a second side upright aperture positioned a first lateral inset distance from a larger upright face and configured to receive a cable fence, and
    wherein the cable fence comprises a cable inserted through the first side upright aperture and the second side upright aperture of each of the plurality of uprights, whereby the cable extends parallel to the top rail.

12. A modular trailer comprising:
    a trailer body;
    a first set of upright pockets joined to the trailer body and comprising modular rail upright pockets;
    a modular rail mount associated with each upright pocket and comprising at least one of an end aperture of each upright pocket; and
    an upright comprising:
       an upright mounting bolt extending downwardly from the upright and attachable to the at least one end aperture; and
       a first pair of side upright apertures comprising a first side upright aperture and a second side upright aperture positioned a first lateral inset distance from a larger upright face and configured to receive a tie down pin insertable into the first side upright aperture and the second side upright aperture to join a rotatably mechanically connected tie down ring positionable between the first side upright aperture and the second side upright aperture.

13. A modular trailer comprising:
    a trailer body;
    a first set of upright pockets joined to the trailer body and comprising modular rail upright pockets;
    a modular rail mount associated with each upright pocket and comprising at least one of an end aperture of each upright pocket; and
    a modular trailer rail assembly comprising:
       a top rail; and
       a plurality of uprights joined perpendicular to the top rail; and
    a modular ramp assembly comprising:
       a spring loaded closure selectably connectable to at least one upright of the plurality of uprights, whereby a ramp is selectably latchable in an upwardly extending position; and
       a lift assistance system comprising a spring disposed axially around an axis member joined to the trailer body by a pin, whereby the modular ramp assembly is selectably removable from the trailer.

14. The modular trailer of claim 13, further comprising:
    a fender mounting system attachable to the trailer body and configured to selectably connect a fender to the trailer body, the fender mounting system comprising:
    a first swivel mount tube attached to the trailer body and comprising:
       a first aperture defined through the first swivel mount tube and configured to receive a swivel attachment disposed through the first aperture in a first direction and into the trailer body;

wherein the first swivel mount tube is configured to receive a fender stud of the fender into an internal area of the first swivel mount tube along an axis perpendicular to the first direction, and wherein the swivel attachment comprises a bolt and a washer configured to be tightened and loosened, whereby the first swivel mount tube rotatably swivels on an axis of the bolt.

* * * * *